(12) United States Patent
Jiang et al.

(10) Patent No.: US 10,899,989 B2
(45) Date of Patent: Jan. 26, 2021

(54) AMINO ACID GRAFTED POLYMER WITH SOOT HANDLING PROPERTIES

(71) Applicant: Afton Chemical Corporation, Richmond, VA (US)

(72) Inventors: Sheng Jiang, Glen Allen, VA (US); Arturo Carranza, Henrico, VA (US)

(73) Assignee: Afton Chemical Corporation, Richmond, VA (US)

( * ) Notice: Subject to any disclaimer, the term of this patent is extended or adjusted under 35 U.S.C. 154(b) by 72 days.

(21) Appl. No.: 16/160,148

(22) Filed: Oct. 15, 2018

(65) Prior Publication Data

US 2020/0115648 A1 Apr. 16, 2020

(51) Int. Cl.
| | | |
|---|---|---|
| *C10M 149/10* | (2006.01) | |
| *C08F 210/16* | (2006.01) | |
| *C10M 169/04* | (2006.01) | |
| *C10N 30/04* | (2006.01) | |
| *C10N 40/25* | (2006.01) | |

(52) U.S. Cl.
CPC ......... *C10M 149/10* (2013.01); *C08F 210/16* (2013.01); *C10M 169/041* (2013.01); *C08F 2810/50* (2013.01); *C10M 2203/003* (2013.01); *C10M 2217/028* (2013.01); *C10N 2030/041* (2020.05); *C10N 2040/25* (2013.01)

(58) Field of Classification Search
CPC combination set(s) only.
See application file for complete search history.

(56) References Cited

U.S. PATENT DOCUMENTS

| | | | |
|---|---|---|---|
| 3,516,944 A | 6/1970 | Litt | |
| 4,049,564 A | 9/1977 | Ryer et al. | |
| 4,102,798 A | 7/1978 | Ryer et al. | |
| 4,113,639 A | 9/1978 | Lonstrup et al. | |
| 4,169,836 A | 10/1979 | Ryer et al. | |
| 4,678,833 A | 7/1987 | McCreedy et al. | |
| 4,702,854 A | 10/1987 | Snyder et al. | |
| 4,831,161 A | 5/1989 | Wang et al. | |
| 4,839,073 A | 6/1989 | Gutierrez et al. | |
| 4,938,880 A | 7/1990 | Waddoups et al. | |
| 5,049,290 A | 9/1991 | Emert et al. | |
| 5,063,262 A | 11/1991 | Hildebrand | |
| 5,075,383 A | 12/1991 | Migdal et al. | |
| 5,085,788 A | 2/1992 | Emert et al. | |
| 5,094,766 A | 3/1992 | Kapuscinksi | |
| 5,139,688 A | 8/1992 | Nalesnik | |
| 5,178,786 A | 1/1993 | Jahnke et al. | |
| 5,306,313 A | 4/1994 | Emert et al. | |
| 5,407,500 A | 4/1995 | Forsberg et al. | |
| 6,107,257 A | 8/2000 | Valcho et al. | |
| 6,172,015 B1 | 1/2001 | Emert | |
| 6,878,799 B2 | 4/2005 | He | |
| 7,214,653 B2 | 5/2007 | Yoneda et al. | |
| 7,943,141 B2 | 5/2011 | Harris et al. | |
| 8,158,748 B2 | 4/2012 | Dershem et al. | |
| 8,883,211 B2 | 11/2014 | Bentley et al. | |
| 8,927,469 B2 | 1/2015 | Mathur et al. | |
| 9,284,411 B2 | 3/2016 | Bentley et al. | |
| 9,944,755 B2 | 4/2018 | Yin et al. | |
| 2004/0048753 A1 | 3/2004 | Ritchie | |
| 2004/0259742 A1 | 12/2004 | Mishra | |
| 2006/0173135 A1* | 8/2006 | Devlin ..................... C08F 8/14 | |
| | | | 525/242 |
| 2008/0182768 A1 | 7/2008 | Devlin et al. | |
| 2009/0192061 A1 | 7/2009 | Boegner et al. | |
| 2009/0270531 A1 | 10/2009 | Ruhe, Jr. | |
| 2010/0160192 A1 | 6/2010 | Ruhe, Jr. | |
| 2012/0264665 A1 | 10/2012 | Wu et al. | |
| 2014/0107001 A1 | 4/2014 | Saccomando | |
| 2014/0187454 A1* | 7/2014 | Brewer ................ C10M 145/40 | |
| | | | 508/216 |
| 2016/0024252 A1 | 1/2016 | Yin et al. | |
| 2016/0152782 A1 | 6/2016 | Cammage et al. | |
| 2017/0175600 A1* | 6/2017 | Douglass ............. C10M 141/12 | |
| 2017/0202971 A1 | 7/2017 | Yin et al. | |
| 2017/0275551 A1 | 9/2017 | Woodward et al. | |
| 2017/0275556 A1 | 9/2017 | Preston | |
| 2018/0016515 A1 | 1/2018 | Lagona | |
| 2018/0163153 A1 | 6/2018 | Cain et al. | |
| 2018/0371357 A1 | 12/2018 | Knapton | |
| 2019/0264126 A1 | 8/2019 | Jiang et al. | |

FOREIGN PATENT DOCUMENTS

| | | |
|---|---|---|
| DE | 202006014282 | 12/2006 |
| DE | 102006059835 | 3/2008 |
| EP | 0338672 | 10/1989 |
| EP | 0552554 A1 | 7/1993 |
| EP | 1489281 | 12/2004 |
| EP | 1686141 | 8/2005 |
| EP | 2557144 | 2/2013 |
| GB | 1547980 A | 7/1979 |
| WO | 9309206 A1 | 5/1993 |
| WO | 2017192202 A1 | 11/2017 |

OTHER PUBLICATIONS

International Search Report; dated Jan. 2, 2020 for PCT Application No. PCT/US 19/55297.
European Search Report; dated Jun. 27, 2019 for EP Application No. 19158966.2.

* cited by examiner

*Primary Examiner* — Ellen M McAvoy
*Assistant Examiner* — Chantel L Graham
(74) *Attorney, Agent, or Firm* — Honigman LLP

(57) ABSTRACT

The present disclosure relates to lubricant additives such as dispersants and dispersant viscosity modifiers including acyl peptide grafted polymers and lubricating oil compositions comprising such additives. The disclosure also relates to the use of lubricant compositions comprising the additives herein for improving the soot or sludge handling characteristics of an engine lubricant composition and while minimizing the deterioration of engine's elastomer compatibility.

28 Claims, No Drawings

AMINO ACID GRAFTED POLYMER WITH SOOT HANDLING PROPERTIES

TECHNICAL FIELD

The present disclosure relates to lubricant additives such as dispersants and dispersant viscosity modifiers comprised of acyl peptide grafted polymers and lubricating oil compositions comprising such additives. The disclosure also relates to the use of lubricant compositions comprising the additives herein for improving the soot or sludge handling characteristics of an engine lubricant composition and while minimizing the deterioration of elastomer compatibility.

BACKGROUND

An engine lubricant provides increased engine protection tending to improve fuel economy and reduce emissions. However, it is generally undesired to sacrifice engine protection and lubricating properties to achieve the benefits of improved fuel economy and reduced emissions. Most lubricants often find a balance behind such properties. For example, an increase in the amount of friction modifiers in the lubricant may be beneficial for fuel economy purposes but may lead to reduced ability of the lubricant to handle wear stresses. Likewise, an increase in the amount of anti-wear agent in the lubricant may provide improved engine protection against wear, but could also reduce emissions through various mechanisms, such as being detrimental to catalyst performance.

Soot and sludge handling components of the lubricant must achieve a similar balance. A dispersant or dispersant viscosity modifier (DVM), for example, can provide excellent soot/sludge handling properties in engine oils, particularly in heavy duty diesel oils, while still contributing to the overall viscometric performance of a finished oil. A DVM can be tailored to fulfill multiple roles in finished oil formulations including those of antioxidants, friction/anti-wear agents, and, in some cases, detergents. This ample versatility allows formulators a greater windows to reduce or increase the treat rate of certain components in finished formulations and to optimize overall engine oil performance. DVMs often include aryl amines and/or other amine moieties that can provide improved anti-wear and dispersant properties. However, aryl amines as well as other primary and/or secondary amines in some instances negatively affect an engine's elastomer compatibility. In the past, a variety of borates, anhydrides, and carboxylic acids have been used to attenuate the effects of unprotected amines. In some instances, aryl amines benefit from having sterically hindered amine moieties, and therefore have a reduced negative impact on the longevity of fluoro-elastomer seals but may still impact seal quality and longevity depending on the treat rate of such amine functionalized DVM.

SUMMARY

In one approach or embodiment, a multi-functional olefin copolymer lubricant additive comprising a reaction product of an acylated olefin copolymer and an amino mono- or di-carboxylic acid is described herein. The reaction product is optionally further reacted with an amine, ester, or alcohol functionalization agent. The amino mono- or di-carboxylic acid has the formula $H_2N-R_1(R_2)-COOH$ wherein $R_1$ is a C1 to C18 hydrocarbyl group and $R_2$ is hydrogen, a linear or branched alkyl group, an aryl group, a hydroxyphenyl group, a heterocyclic amino group, a carboxyl group, an amido group, an amino group, a hydroxyl group, a thiol, a thioester, selenium, or combinations thereof.

In other approaches or embodiments, the multi-functional olefin copolymer lubricant additive of the previous paragraph can be combined with and/or include additional features that may be any of or any combination of the following: wherein the amine, ester, or alcohol functionalization agent is selected from aromatic amines, polyaromatic amines, primary amines, secondary amines, primary or secondary alcohols, napthyl alkyl amines, and mixtures thereof; and/or wherein the reaction product is formed in either the L or D isomeric form; and/or wherein the reaction product is either neutral or ionic; and/or wherein the acylated olefin copolymer includes an olefin copolymer having grafted thereon from 0.1 to 0.8 carboxylic groups per 1000 number average molecular weight units of the olefin copolymer; and/or wherein the olefin copolymer has a number average molecular weight between about 5,000 and about 200,000 as measured by GPC using polystyrene as reference; and/or wherein $R_1$ is a methylene group and $R_2$ is the heterocyclic amino group selected from an indole alkyl group or an imidazole alkyl group; and/or wherein the amino mono- or di-carboxylic acid is selected from amino hexanoic acid, 2-amino-3-phenyl propanoic acid, 2-amino-3-(1H-indol-3-yl) propanoic acid, 2-amino-3-(1H-imidazol-5-yl) propanoic acid, 2-amino butane dioic acid, 2-amino pentane dioic acid, 2-amino-4-methylpentanoic acid, and mixtures thereof; and/or wherein the reaction product is further reacted with the amine functionalization agent and wherein a primary or secondary amine thereof is capped with an oxazoline or derivative thereof and/or wherein the oxazoline or derivative thereof is 2-phenyl-2-oxazoline; 2-ethyl-2 oxazoline; 2-methyl-2-oxazoline; 2-benzyl-4,4-dimethyl-2-oxazoline; 2-ethyl-4,4-dimethyl-2 oxazoline; 2,4,4-trimethyl-2-oxazoline; 4,4-dimethyl-2-oxazoline; 2,4,5-trimethyl-3-oxazoline; 2-(2,6-dimethoxyphenyl)-4,4-dimethyl-2-oxazoline; 2-[1-(hydroxymethyl)ethyl] oxazoline; mixtures thereof, or derivatives thereof; and/or wherein the reaction product is further reacted with the amine functionalization agent and wherein the amine functionalization agent is selected from N-arylphenylene-diamine, 1-(2-amino-ethyl)-imidazolidin-2-one, N-(3-aminopropyl) morpholine, 3-(dimethylamino)-1-propylamine, N-phenyl-p-phenylenediamine, N-(3-aminopropyl)-2 pyrrolidinone, aminoethylacetamide, alanine methyl ester, 1-(3-aminopropyl) imidazole, polyetheramine, phenoxypropylamine, aromatic derivatives thereof, and combinations thereof; and/or wherein the amine functionalization agent is an N-arylphenylenediame of the formula

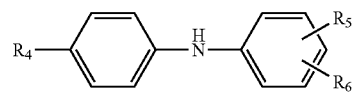

wherein $R_4$ is hydrogen, —NH-aryl, —NH-arylalkyl, —NH-alkyl, or a branched or straight chain radical having from 4 to 24 carbon atoms that can be alkyl, alkenyl, alkoxyl aralkyl, alkaryl, hydroxyalkyl or aminoalkyl; $R_5$ is —NH$_2$, $CH_2-(CH_2)_n-NH_2$, or $CH_2$-aryl-NH$_2$, in which n is an integer from 1 to 10; and $R_6$ is hydrogen, alkyl, alkenyl, alkoxyl, aralkyl, or alkaryl having from 4 to 24 carbon atoms; and/or wherein the N-arylphenylenediame is selected from N-phenyl-1,4-phenylenediamine; N-phenyl-1,3-phenylendiamine; N-phenyl-1,2-phenylenediamine; and mixtures thereof and/or wherein the acylated olefin copolymer is derived from a copolymer of ethylene and one or more C3 to C18 alpha-olefins and a grafted ethylenically unsaturated carboxylic acid material having at least one ethylenic bond and at least one carboxylic acid group or anhydride group thereof or a polar group that is convertible into a carboxyl group reacted with the olefin copolymer; and/or wherein the ethylenically unsaturated carboxylic acid material is selected from acrylic acid, methacrylate acid, cinnamic acid, crotonic acid, maleic acid, fumaric acid or anhydride derivatives thereof.

In another approach or embodiment, a lubricant composition is described herein. The lubricant composition includes a major amount of base oil of lubricating viscosity and a multi-functional olefin copolymer viscosity modifier. The multi-functional olefin copolymer viscosity modifier includes a reaction product of an acylated olefin copolymer and an amino mono- or di-carboxylic acid. The reaction product is optionally further reacted with an amine, ester, or alcohol functionalization agent. The amino mono- or di-carboxylic acid has the formula $H_2N—R_1(R_2)—COOH$ wherein $R_1$ is a C1 to C18 hydrocarbyl group and $R_2$ is hydrogen, a linear or branched alkyl group, an aryl group, a hydroxyphenyl group, a heterocyclic amino group, a carboxyl group, an amido group, an amino group, a hydroxyl group, a thiol, a thioester, selenium, or combinations thereof.

In yet further approaches or embodiments, the lubricant composition of the previous paragraph can be combined with and/or include additional features that may be any of or any combination of the following: wherein the amine, ester, or alcohol functionalization agent is selected from aromatic amines, polyaromatic amines, primary amines, secondary amines, primary or secondary alcohols, napthyl alkyl amines, and mixtures thereof and/or wherein the reaction product is formed in either the L or D isomeric form; and/or wherein the reaction product is either neutral or ionic; and/or wherein the acylated olefin copolymer includes an olefin copolymer having grafted thereon from 0.1 to 0.8 carboxylic groups per 1000 number average molecular weight units of the olefin copolymer; and/or wherein the olefin copolymer has a number average molecular weight between about 5,000 and about 200,000 as measured by GPC using polystyrene as reference; and/or wherein $R_1$ is a methylene group and $R_2$ is the heterocyclic amino group selected from an indole alkyl group or an imidazole alkyl group; and/or wherein the amino mono- or di-carboxylic acid is selected from amino hexanoic acid, 2-amino-3-phenyl propanoic acid, 2-amino-3-(1H-indol-3-yl) propanoic acid, 2-amino-3-(1H-imidazol-5-yl) propanoic acid, 2-amino butane dioic acid, 2-amino pentane dioic acid, 2-amino-4-methylpentanoic acid, and mixtures thereof; and/or wherein the reaction product is further reacted with the amine functionalization agent and wherein a primary or secondary amine thereof is capped with an oxazoline or derivative thereof and/or wherein the oxazoline or derivative thereof is 2-phenyl-2-oxazoline; 2-ethyl-2 oxazoline; 2-methyl-2-oxazoline; 2-benzyl-4,4-dimethyl-2-oxazoline; 2-ethyl-4,4-dimethyl-2 oxazoline; 2,4,4-trimethyl-2-oxazoline; 4,4-dimethyl-2-oxazoline; 2,4,5-trimethyl-3-oxazoline; 2-(2,6-dimethoxyphenyl)-4,4-dimethyl-2-oxazoline; 2-[1-(hydroxymethyl)ethyl] oxazoline; mixtures thereof, or derivatives thereof; and/or wherein the reaction product is further reacted with the amine functionalization agent and wherein the amine functionalization agent is selected from N-arylphenylene-diamine, 1-(2-amino-ethyl)-imidazolidin-2-one, N-(3-aminopropyl) morpholine, 3-(dimethylamino)-1-propylamine, N-phenyl-p-phenylenediamine, N-(3-aminopropyl)-2 pyrrolidinone, aminoethylacetamide, alanine methyl ester, 1-(3-aminopropyl) imidazole, polyetheramine, phenoxypropylamine, aromatic derivatives thereof, and combinations thereof and/or wherein the amine functionalization agent is an N-arylphenylenediame of the formula

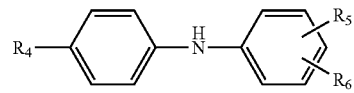

wherein $R_4$ is hydrogen, —NH-aryl, —NH-arylalkyl, —NH-alkyl, or a branched or straight chain radical having from 4 to 24 carbon atoms that can be alkyl, alkenyl, alkoxyl aralkyl, alkaryl, hydroxyalkyl or aminoalkyl; $R_5$ is —NH$_2$, $CH_2$—$(CH_2)$, —NH$_2$, or $CH_2$-aryl-NH$_2$, in which n is an integer from 1 to 10; and $R_6$ is hydrogen, alkyl, alkenyl, alkoxyl, aralkyl, or alkaryl having from 4 to 24 carbon atoms; and/or wherein the N-arylphenylenediame is selected from N-phenyl-1,4-phenylenediamine; N-phenyl-1,3-phenylendiamine; N-phenyl-1,2-phenylenediamine; and mixtures thereof and/or wherein the acylated olefin copolymer is derived from a copolymer of ethylene and one or more C3 to C18 alpha-olefins and a grafted ethylenically unsaturated carboxylic acid material having at least one ethylenic bond and at least one carboxylic acid group or anhydride group thereof or a polar group that is convertible into a carboxyl group reacted with the olefin copolymer; and/or wherein the ethylenically unsaturated carboxylic acid material is selected from acrylic acid, methacrylate acid, cinnamic acid, crotonic acid, maleic acid, fumaric acid or anhydride derivatives thereof.

In yet further approaches or embodiments, the present disclosure further describes uses of the multi-functional olefin copolymer lubricant additive or the lubricant composition of the previous paragraphs for lubricating a machine part or providing engine lubrication to minimize degradation of engine seals. Methods of lubricating machine parts or an engine using the above describes additives and compositions are also provided herein.

DETAILED DESCRIPTION

Engine or crankcase lubricant compositions are used in vehicles containing spark ignition and compression ignition engines. Such engines may be used in automotive, truck, and/or train applications, to suggest but a few examples, and may be operated on fuels including, but not limited to, gasoline, diesel, alcohol, compressed natural gas, and the like. The lubricants or lubricant compositions herein may be suitable for use as engine or crankcase lubricants, such as automotive crankcase lubricants that, in some circumstances, meet or exceed the ILSAC GF-5 and/or API CJ-4 lubricant standards.

As noted in the background, engine oils commonly include many additives. Dispersants and dispersant viscosity modifiers are common additives in engine oil to help by dispersing sludge, carbon, soot, oxidation products, and other deposit precursors. Such additives aid in keeping engine parts clean, prolonging engine life and helping to maintain proper emissions and good fuel economy. The result may be, for example, reduced deposit formation, less oil oxidation, and/or less viscosity increase. In some approaches, the dispersants or dispersant viscosity modifiers accomplish this by inhibiting particle-to-particle aggregation. Accordingly, the soot and sludge handling properties of the lubricant are generally improved as the amount of dispersant or dispersant viscosity modifier in the lubricant composition is increased, but increasing the amount of those additives can, in some instances, adversely affect elastomer compatibility. Described herein, on the other hand, are lubricant additives with dispersant properties, and lubricating oils including such additives that have good soot handling properties and/or viscosity modifying properties and, at the same time, are compatible with fluoro elastomers as compared to prior lubricant additives.

Herein, a novel approach to lubricant additives, such as dispersant or dispersant viscosity modifiers, is provided that introduces one or more acyl peptide bonds (—R—CO—NH—) through amino mono- or di-carboxylic acids to acylated olefin copolymer (OCP) viscosity modifiers as dispersant moieties and/or linkers to further functionalization through amine, alcohol, oxazolines, oxazolidinones, isatoic anhydride, lactone, lactams and other reactive moieties directly or indirectly to the OCP backbone. The nature of the further functionalization reactive moieties (in addition to the amino mono- or di-carboxylic acids) may be used to fine tune both dispersant and viscometric properties of the additive. These further reactive moieties can include, for example, molecules that provide dispersant or other properties, including N-phenyl-phenylenedi amine (NPPDA), 1-(2-amino-ethyl)-imidazolidin-2one, 4-(3-aminopropyl) morpholine, 3-(dimethlamino)-1-propylamine, N-Phenyl-p-phenylediamine, N-(3-aminopropyl)-2 pyrrolidinone, aminoethylacetamide, β-alanine methyl ester, 1-(3-aminopropyl) imidazole, branched β-alcohols, polyesters, polyethers, polyetheramines, phenoxypropylamines, their aromatic derivatives or combinations thereof. Normally, primary amines are preferred for this further functionalization (in addition to the amino mono- or di-carboxylic acids) because of their considerably higher product yield and relatively more rapid polymerization kinetics.

When used in engine oil formulations at effective treat rates, the functionalized additives herein with the acyl peptide linked polymers and optional further functionalization (as described above) can provide excellent soot dispersant activity and other benefits such as better low temperature performance, and lower friction, seal compatibility, etc.

In one approach, disclosed herein is the use of amino acids, optionally in combination with polyamines and/or oxazolines, as a chemical modification to lubricant additives that tends to grant additional fluoro elastomer seal protection and unexpectedly improved dispersant performance, such as functionalized dispersant olefin copolymer viscosity modifiers. The present disclosure provides a method of introducing amino acid linking moieties to acylated OCP's, introducing additional amine functionalities, as well as optionally capping sterically hindered and/or exposed primary and/or secondary amines with oxazolines.

Acylated Olefin Copolymer:

As noted above, the lubricant additives herein, in one approach, may include an acylated olefin copolymer viscosity modifier, viscosity index improver, or dispersant. The olefin copolymer, in such approach, may have a copolymer backbone of ethylene and an alkylene with 3 to 18 carbon atoms, for example 3 to 5, 3 to 10, 3 to 15, 5 to 10, 8 to 12, 10 to 15, or 10 to 18 carbon atoms. In some approaches, the alkylene may be propylene, isopropylene, butylene, isobutylene, n-pentylene, isopentylene, and/or neopentylene, and mixtures thereof.

In other approaches, the polymers are copolymers of ethylene and one or more C3 to C18 alpha-olefins. Copolymers of ethylene and propylene are most preferred. Other alpha-olefins suitable in place of propylene to form the copolymer or to be used in combination with ethylene and propylene to form a terpolymer include 1-butene, 1-pentene, 1-hexene, 1-octene and styrene; αω-diolefins such as 1,5-hexadiene, 1,6-heptadiene, 1,7-octadiene; branched chain alpha-olefins such as 4-methylbutene-1,5-methylpentene-1 and 6-methylbeptene-1; and mixtures thereof.

More complex polymer substrates, often designated as interpolymers, may be prepared using a third component. The third component generally used to prepare an interpolymer substrate is a polyene monomer selected from non-conjugated dienes and trienes. The non-conjugated diene component is one having from 5 to 14 carbon atoms in the chain. Preferably, the diene monomer is characterized by the presence of a vinyl group in its structure and can include cyclic and bicyclo compounds. Representative dienes include 1,4-hexadiene, 1,4-cyclohexadiene, dicyclopentadiene, 5-ethylidene-2-norbornene, 5-methylene-2-norborene, 1,5-heptadiene, and 1,6-octadiene. A mixture of more than one diene can be used in the preparation of the interpolymer. A preferred non-conjugated diene for preparing a terpolymer or interpolymer substrate is 1,4-hexadiene.

The triene component will have at least two non-conjugated double bonds, and up to about 30 carbon atoms in the chain. Typical trienes useful in preparing the interpolymer of this disclosure are 1-isopropylidene-3a,4,7,7a-tetrahydroindene, 1-isopropylidene dicyclopentadiene, dihydro-isodicyclopentadiene, and 2-(2-methylene-4-methyl-3-pentenyl) [2.2.1] bicyclo-5-heptene.

Ethylene-propylene or higher alpha-olefin copolymers may consist of from about 15 to about 80 mole percent ethylene and from about 85 to about 20 mole percent C3 to C18 alpha-olefin with the preferred mole ratios being from about 35 to about 75 mole percent ethylene and from about 65 to about 25 mole percent of a C3 to C18 alpha-olefin, with the more preferred proportions being from 50 to about 70 mole percent ethylene and about 50 to about 30 mole percent C3 to C18 alpha-olefin, and the most preferred proportions being from about 55 to about 65 mole percent ethylene and about 45 to about 35 mole percent C3 to C18 alpha-olefin.

Specific examples of the preparation of acylated olefin copolymers are provided in U.S. Pat. No. 6,107,257, the contents of which is incorporated herein by reference in its entirety. Terpolymer variations of the foregoing polymers may contain from about 0.1 to 10 mole percent of a non-conjugated diene or triene. The terms polymer and copolymer are used generically to encompass ethylene copolymers, terpolymers or interpolymers. These materials may contain minor amounts of other olefinic monomers so long as the basic characteristics of the ethylene copolymers are not materially changed.

In some approaches, the polymerization reaction used to form the ethylene-olefin copolymer substrate may be generally carried out in the presence of a conventional Ziegler-Natta or metallocene catalyst system. The polymerization medium is not specific and can include solution, slurry, or gas phase processes, as known to those skilled in the art. When solution polymerization is employed, the solvent may be any suitable inert hydrocarbon solvent that is liquid under reaction conditions for polymerization of alpha-olefins; examples of satisfactory hydrocarbon solvents include straight chain paraffins having from 5 to 8 carbon atoms, with hexane being preferred. Aromatic hydrocarbons, preferably aromatic hydrocarbon having a single benzene nucleus, such as benzene, toluene and the like; and saturated cyclic hydrocarbons having boiling point ranges approximating those of the straight chain paraffinic hydrocarbons and aromatic hydrocarbons described above, are particularly suitable. The solvent selected may be a mixture of one or more of the foregoing hydrocarbons. When slurry polymerization is employed, the liquid phase for polymerization is preferably liquid propylene. It is desirable that the polymerization medium be free of substances that will interfere with the catalyst components.

In one embodiment, the olefin copolymer substrate is an ethylene copolymer or terpolymer such as an oil soluble linear or branched polymer having a number average molecular weight of about 5,000 to about 200,000, for example about 5,000 to about 150,000, about 5,000 to about 100,000, about 20,000 to about 200,000, about 20,000 to about 150,000, about 50,000 to about 150,000, or about 50,000 to about 100,000. As discussed herein, number average molecular weight is measured by GPC using polystyrene as a calibration reference.

The number average molecular weight (Mn) for any embodiment herein may be determined with a gel permeation chromatography (GPC) instrument obtained from Waters or the like instrument and the data processed with Waters Empower Software or the like software. The GPC instrument may be equipped with a Waters Separations Module and Waters Refractive Index detector (or the like optional equipment). The GPC operating conditions may include a guard column, 4 Agilent PLgel columns (length of 300×7.5 mm; particle size of 5µ, and pore size ranging from 100-10000 Å) with the column temperature at about 40° C. Un-stabilized HPLC grade tetrahydrofuran (THF) may be used as solvent, at a flow rate of 1.0 mL/min. The GPC instrument may be calibrated with commercially available polystyrene (PS) standards having a narrow molecular weight distribution ranging from 500-380,000 g/mol. The calibration curve can be extrapolated for samples having a mass less than 500 g/mol. Samples and PS standards can be in dissolved in THF and prepared at concentration of 0.1-0.5 wt. % and used without filtration. GPC measurements are also described in U.S. Pat. No. 5,266,223, which is incorporated herein by reference. The GPC method additionally provides molecular weight distribution information; see, for example, W. W. Yau, J. J. Kirkland and D. D. Bly, "Modern Size Exclusion Liquid Chromatography", John Wiley and Sons, New York, 1979, also incorporated herein by reference.

The acyl groups grated to the olefin copolymer are obtained from ethylenically unsaturated carboxylic acid or anhydride reactants that include at least one carbon-carbon double bond and further comprise at least one carboxylic acid and/or dicarboxylic acid or anhydride group. In one approach, the reactants forming the acyl groups grafted on to the olefin copolymer are selected acrylic acid, methacrylic acid, cinnamic acid, ferulic acid, ortho coumaric acid, meta coumaric acid, para coumaric acid, crotonic acid, maleic acid, maleic anhydride, fumaric acid, itaconic acid and itaconic anhydride or a combination thereof. In another approach, the reactants forming the acyl groups grafted on to the olefin copolymer are selected from maleic acid, fumaric acid, maleic anhydride, or a combination thereof. In yet a further approach, the reactants forming the acyl groups grafted on to the olefin copolymer include maleic anhydride moieties.

In one embodiment, the olefin copolymer has grafted thereon from about 0.1 to about 0.8 maleic acid groups per 1000 number average molecular weight units of olefin copolymer, for example about 0.2 to about 0.75, about 0.5 to about 0.75, about 0.4 to about 0.5, or about 0.4 to about 0.8, or about 0.1 to about 0.4 acyl groups per 1000 number average molecular weight units of the olefin copolymer. In some further embodiments, the olefin copolymer has grafted thereon about 0.2, about 0.3, about 0.4, about 0.5, about 0.6 or about 0.75 maleic anhydride groups per 1000 number average molecular weight units of olefin copolymer. The examples herein provide further discussion on how the grafting value is calculated.

The carboxylic reactant is grafted onto the prescribed polymer backbone in an amount to provide about 0.1 to about 0.8 carboxylic groups per 1000 number average molecular weight units of the polymer backbone, preferably about 0.3 to about 0.75 carboxylic groups per 1000 number average molecular weight. For example, and in one approach, a copolymer substrate with Mn of 20,000 is grafted with 6 to 15 carboxylic groups per polymer chain or 3 to 7.5 moles of maleic anhydride per mole of polymer. In another example, a copolymer with Mn of 100,000 is grafted with 30 to 75 carboxylic groups per polymer chain or 15 to 37.5 moles of maleic anhydride per mole of polymer. The minimum level of functionality is the level needed to achieve the minimum satisfactory dispersancy performance. Above the maximum functionality level little, if any, additional dispersancy performance is noted and/or other properties of the additive may be adversely affected.

The grafting reaction to form the acylated olefin copolymers is generally carried out with the aid of a free-radical initiator either in solution or in bulk, as in an extruder or intensive mixing device. When the polymerization is carried out in hexane solution, it is economically convenient to carry out the grafting reaction in hexane as described in U.S. Pat. Nos. 4,340,689; 4,670,515; and 4,948,842 incorporated herein by reference. The resulting polymer intermediate is characterized by having carboxylic acid acylating functionality randomly distributed within its structure.

In the bulk process for forming the acylated olefin copolymers, the olefin copolymer is fed to rubber or plastic processing equipment such as an extruder, intensive mixer or masticator, heated to a temperature of about 150° to about 400° C. and the ethylenically unsaturated carboxylic acid reagent and free-radical initiator are separately co-fed to the molten polymer to effect grafting. The reaction is carried out optionally with mixing conditions to effect shearing and grafting of the ethylene copolymers according to U.S. Pat. No. 5,075,383, incorporated herein by reference. The processing equipment is generally purged with nitrogen to prevent oxidation of the polymer and to aid in venting unreacted reagents and byproducts of the grafting reaction. The residence time in the processing equipment is sufficient to provide for the desired degree of acylation and to allow for purification of the acylated copolymer via venting. Mineral or synthetic lubricating oil may optionally be added to the processing equipment after the venting stage to dissolve the acylated copolymer.

The free-radical initiators which may be used to graft the ethylenically unsaturated carboxylic acid material to the polymer backbone include peroxides, hydroperoxides, peresters, and also azo compounds and preferably those which have a boiling point greater than about 100° C. and decompose thermally within the grafting temperature range to provide free radicals. Representatives of these free-radical initiators are azobutyronitrile, dicumyl peroxide, 2,5-dimethylhexane-2,5-bis-tertiarybutyl peroxide and 2,5-dimethylhex-3-yne-2,5-bis-tertiary-butyl peroxide. The initiator is used in an amount of between about 0.005% and about 1% by weight based on the weight of the reaction mixture.

Other methods known in the art for effecting reaction of ethylene-olefin copolymers with ethylenically unsaturated carboxylic reagents, such as halogenation reactions, thermal or "ene" reactions or mixtures thereof, can be used instead of the free-radical grafting process. Such reactions are conveniently carried out in mineral oil or bulk by heating the reactants at temperatures of about 250° to about 400° C. under an inert atmosphere to avoid the generation of free radicals and oxidation byproducts. "Ene" reactions are a preferred method of grafting when the ethylene-olefin copolymer contains unsaturation. To achieve the high graft levels, 0.3 to 0.5 carboxylic groups per 1000 Mn, desired by this disclosure, it may be necessary to follow or proceed the "ene" or thermal graft reaction with a free radical graft reaction.

Amino Acid Functionalization:

The lubricant additives of the present disclosure are also functionalized with one or more amino acids linking groups and/or dispersant moieties. In one approach, the lubricant additive may be a dispersant viscosity modifier wherein the acyl group of the acylated olefin copolymer is further functionalized with an amino acid (and then optionally further functionalized as also discussed herein). The amino acid functionalization can be accomplished by reacting the acylated olefin copolymer as discussed in the approaches or embodiments above with an amino mono- or di-carboxylic acid, wherein the amino mono- or di-carboxylic acid has the formula

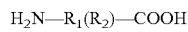
$$H_2N—R_1(R_2)—COOH \quad \text{(Formula I)}$$

wherein $R_1$ is a bivalent C1 to C18 hydrocarbyl and $R_2$ is hydrogen, a linear or branched alkyl group, an aryl group, an alkylaryl group, a hydroxyphenyl group, a heterocyclic amino group, a carboxyl group, an amido group, an amino group, a hydroxyl group, a thiol, a thioester, selenium, or combinations thereof. The $R_2$ group is a substituent of the $R_1$ group.

In other approaches, $R_2$ may be a linear or branched $C_1$ to $C_6$ alkyl group, a phenyl, a naphthyl, a heteroaryl, a heterocyclic group, —N(R$_3$)$_2$, —C(O)OR$_3$, —C(O)R$_3$, —C(O)N (R$_3$)$_2$, —SR$_3$, —S(O)$_2$R$_3$, —S(O)$_2$N(R$_3$)$_2$, OR$_3$, SeR$_3$, wherein the linear or branched $C_1$ to $C_6$ alkyl group, phenyl, naphthyl, heteroaryl, or heterocyclic group is optionally substituted with phenyl, naphthyl, a 5-10 membered heteroaryl, a 5-6 membered heterocyclic, —N(R$_3$)$_2$, —C(O) OR$_3$, —C(O)R$_3$, —C(O)N(R$_3$)$_2$, —SR$_3$, —S(O)$_2$R$_3$, —S(O)$_2$ N(R$_3$)$_2$, OR$_3$, or SeR$_3$, or combinations thereof; and $R_3$ is hydrogen or $C_1$ to $C_4$ alkyl.

In some embodiments, $R_1$ is a bivalent $C_1$ to $C_{18}$ alkyl group that is linear. In a further embodiment, $R_1$ is a bivalent $C_1$ to $C_6$ alkyl group that is linear. In still a further embodiment, $R_1$ is n-pentylene. In another embodiment, $R_1$ is methylene. In some approaches, $R_1$ is a methylene group and $R_2$ is the heterocyclic amino group selected from an indole alkyl group or an imidazole alkyl group.

In some approaches, the amino mono- or di-carboxylic acid is selected from amino hexanoic acid; 2-amino-3-phenyl propanoic acid; 2-amino-3-(1H-indol-3-yl) propanoic acid; 2-amino-3-(1H-imidazol-5-yl) propanoic acid; 2-amino butane dioic acid; 2-amino pentane dioic acid; 2-amino-4-methylpentanoic acid; and mixtures thereof. In some embodiments, the amino acid functionalization may include one amino acid or two or more amino acids linked in series by peptide bonds, i.e. dipeptide, tripeptide, etc.

In other embodiments, the amino acid functionalization may include natural amino acids such as those selected from the group consisting of alanine, arginine, asparagine, aspartic acid, cysteine, selenocysteine, glutamine, glutamic acid, glycine, histidine, isoleucine, leucine, lysine, methionine, phenylalanine, proline, serine, threonine, tryptophan, tyrosine, and valine. Some embodiments include aspartic acid, glutamic acid, histidine, and tryptophan. In other embodiments, the amino acids are d amino acids. In some embodiments, the amino acids are l amino acids. In yet further embodiments, the amino acids are a mixture of d and l amino acids.

In other approaches, the amino acid functionalization may include non-proteogenic amino acids such as 6-amino hexanoic acid, β-alanine, γ-aminobutyric acid σ-aminolevulinic acid, alanine, aminiosobutyric acid, dehydroalanine, norvaline, norleucine, α-amino-n-heptanoic acid, Alloisoleucine, pipecolic acid, Homocysteine, sarcosine, N-propyl glycine, N-propyl glycine, N-methyl alanine, and N-ethyl alanine, or mixtures thereof. In some embodiments, the non-proteogenic amino acid is isomerically pure with respect to the stereochemistry at the carbon of the $R_1$ alkyl group where the $R_2$ group is attached, i.e. the carbon has either R or S stereochemistry for most of the sample. In some embodiments, the non-proteogenic amino acid is mixture of isomers with respect to the stereochemistry at the carbon of the $R_1$ alkyl group where the $R_2$ group is attached.

The addition of the amino acid to the OCP polymer provides, in some approaches, at least two functions to the additive. The amino acid may function as a spacer that can modify the orientation of the further amine or alcohol functionalization that may improve viscometrics. Additionally, the amino acid may introduce bi-functionalities to the polymer backbone based on the added amino acid functionality combined with the further amine, ester, or alcohol functionalization agent. The amino acid may also introduce new degrees of polarity depending on the amino acid's $R_2$ group, which can also aid in both dispensency and/or tribological properties.

Olefin Copolymer (OCP) Functionalization:

The lubricant additives of the present disclosure are optionally further functionalized on the carboxyl moiety of the amino acid or peptide. In one approach, such OCP supplemental functionalization is a reaction product of an amine, ester, or alcohol functionalization agent with the above described amino acid functionalized OCP polymer. The further or supplemental functionalization agent may be selected from aromatic amines, polyaromatic amines, primary amines, secondary amines, primary or secondary alcohols, napthyl alkyl amines, and mixtures thereof. In some approaches, the further or supplemental functionalization agent includes amines and may include one or more primary and/or secondary aryl amines and, optionally, one or more primary and/or secondary alkyl amines. In other approaches, the further or supplemental functionalization agents may include, for example, molecules that provide dispersant property or other properties, including N-phenyl-phenylenediamine (NPPDA), 1-(2-amino-ethyl)-imidazolidin-2one, 4-(3-aminopropyl) morpholine, 3-(dimethlamino)-1-propylamine, N-Phenyl-p-phenylediamine, N-(3-aminopropyl)-2 pyrrolidinone, aminoethylacetamide, β-alanine methyl ester, 1-(3-aminopropyl) imidazole, branched β-alcohols, polyesters, polyethers, polyether amines, phenoxypropylamines, their aromatic derivatives or combinations thereof. In some approaches, primary amines are preferred for this further functionalization (in addition to the amino mono- or di-carboxylic acids) because of their considerably higher product yield and relatively more rapid kinetics.

In one exemplary aspect of this approach, the carboxyl moiety of amino acids of the lubricant additives of the present disclosure are further functionalized with an amine-containing moiety of Formula II

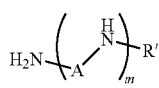 (Formula II)

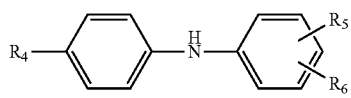 (Formula III)

wherein A is a bivalent phenyl group, optionally substituted with up to four $C_{1-6}$ alkyl substituents; R' is hydrogen, $C_{1-6}$ alkyl, or phenyl, wherein the alkyl and phenyl group are each optionally and independently substituted with up to three instances of a chemical moiety independently selected from the group consisting of halo, nitro, cyano, —C(O)($C_{1-4}$ alkyl), benzyl, benzoyl, and $C_{1-4}$ alkyl; and m is an integer from 1 to 10.

In one embodiment of the above aspect, A may be a moiety selected from

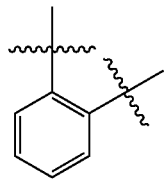 (A1)

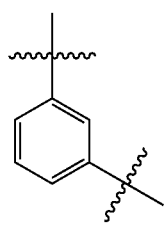 (A2)

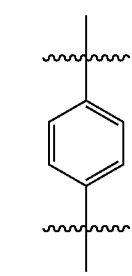 (A3)

each of which is optionally substituted with up to four $C_{1-6}$ alkyl substituents. In a further embodiment, A is A3, optionally substituted with up to four $C_{1-6}$ alkyl substituents. In still a further embodiment, A is unsubstituted.

In another embodiment, R' is methyl, ethyl, propyl, isopropyl, butyl, or tert-butyl. In another embodiment, R' is phenyl, which is optionally substituted with up to three instances of a chemical moiety independently selected from the group consisting of halo, nitro, cyano, —C(O)($C_{1-4}$ alkyl), benzyl, benzoyl, and $C_{1-4}$ alkyl. In a further embodiment, R' is phenyl, which is optionally substituted with halo, $C_{1-4}$ alkyl, or phenyl. In still a further embodiment, R' is unsubstituted phenyl. In some embodiments, m is an integer from 1 to 5. In some other embodiments, m is an integer from 1 to 3. In a further embodiment, m is 1. In one embodiment, m is 1; A is A3, and R' is unsubstituted phenyl.

In yet other approaches or embodiments, any of the lubricant additives herein and, in particular, the carboxyl moiety of the amino acids, include further amine-functionalization obtained from an N-arylphenylenediame of the Formula III wherein $R_4$ is hydrogen, —NH-aryl, —NH-arylalkyl, —NH-alkyl, or a branched or straight chain radical having from 4 to 24 carbon atoms that can be alkyl, alkenyl, alkoxyl aralkyl, alkaryl, hydroxyalkyl or aminoalkyl; $R_5$ is —$NH_2$, $CH_2$—($CH_2$), —$NH_2$, $CH_2$-aryl-$NH_2$, in which n is an integer from 1 to 10; and $R_6$ is hydrogen, alkyl, alkenyl, alkoxyl, aralkyl, alkaryl having from 4 to 24 carbon atoms.

In other approaches, the multi-functional viscosity modifiers herein include amine-functionalization provided from the N-arylphenylenediame being selected from N-phenyl-1,4-phenylenediamine; N-phenyl-1,3-phenylendiamine; N-phenyl-1,2-phenylenediamine; and mixtures thereof.

In other approaches, the additives of the present disclosure are functionalized with any numerous polyamines in preparing the functionalized dispersant viscosity modifier or dispersant. For example and in some approaches, non-limiting exemplary polyamines may include N-phenyl-1,4-phenylenediamine (NPPDA), aminoguanidine bicarbonate (AGBC), diethylene triamine (DETA), triethylene tetramine (TETA), tetraethylene pentamine (TEPA), pentaethylene hexamine (PEHA) and heavy polyamines. In a preferred embodiment, the polyamine is NPPDA. A heavy polyamine may comprise a mixture of polyalkylenepolyamines having small amounts of lower polyamine oligomers such as TEPA and PEHA, but primarily oligomers having seven or more nitrogen atoms, two or more primary amines per molecule, and more extensive branching than conventional polyamine mixtures. Additional non-limiting polyamines which may be used to prepare the hydrocarbyl-substituted succinimide dispersant are disclosed in U.S. Pat. No. 6,548,458, the disclosure of which is incorporated herein by reference in its entirety. In an embodiment of the disclosure, the polyamine may be selected from tetraethylene pentamine (TEPA).

Oxazoline Capping Agent:

In some approaches of this disclosure, the lubricant additives herein may optionally include an oxazoline-derived capping agent such as an oxazoline or derivative thereof of Formula IV

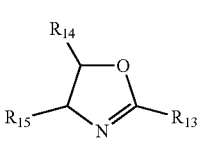 (Formula IV)

wherein $R_{13}$ and $R_{15}$ are each independently selected from the group consisting of hydrogen, halo, nitro, cyano, a $C_1$ to $C_{32}$ aliphatic group, phenyl, naphthyl, a 3-7 membered heterocyclic group, a 5-6 membered heteroaryl group, and wherein up to 5 carbons of said $C_1$ to $C_{32}$ aliphatic group are independently and optionally replaced with a bivalent group selected from —O—, —NH—, —N($C_{1-4}$ alkyl)-, —C(O)—, —C(O)O—, —C(O)NH—, —C(O)N($C_{14}$ alkyl)-, and wherein each $R_{13}$ and $R_{15}$ is independently and optionally substituted with up to three substituents selected from $C_1$ to $C_6$ alkyl, phenyl, naphthyl, a 3-7 membered heterocyclic group, a 5-6 membered heteroaryl group, halo, nitro, and cyano; and $R_2$ is hydrogen, halo, or a $C_{1-4}$ alkyl.

In another embodiment, $R_{13}$ is selected from the group consisting of halo, nitro, cyano, methyl, ethyl, propyl, isopropyl, butyl, isobutyl, sec-butyl, tert-butyl, n-pentyl, n-heptyl, 2-ethylhexyl, phenyl, furyl, thiophenyl, 2H-pyrrolyl, pyrrolyl, oxazolyl, thazolyl, imidazolyl, pyrazolyl, isoxazolyl, isothiazolyl, 1,3,4-thiadiazolyl, 2H-pyranyl, 4-H-pranyl, pyridyl, pyridazyl, pyrimidyl, pyrazolyl, pyrazyl, and 1,3,5-triazyl, optionally substituted with up to three substituents selected from $C_1$ to $C_6$ alkyl, phenyl, halo, nitro, and cyano.

In some approaches, $R_{13}$ is ethyl or phenyl, or $R_{13}$ may be hydrogen. In some approaches, $R_{14}$ is hydrogen. In some other embodiments, $R_{15}$ is hydrogen. In some further embodiments, $R_{15}$ and $R_{14}$ are both hydrogen. In one further embodiment, $R_{13}$ is ethyl or phenyl and $R_{15}$ and $R_{14}$ are both hydrogen.

In other approaches, the oxazoline or derivative thereof suitable for a capping agent herein may be selected from 2-phenyl-2-oxazoline, 2-ethyl-2 oxazoline, 2-methyl-2-oxazoline, 2-benzyl-4,4-dimethyl-2-oxazoline, 2-ethyl-4,4-dimethyl-2 oxazoline, 2,4,4-trimethyl-2-oxazoline, 4,4-dimethyl-2-oxazoline, 2,4,5-trimethyl-3-oxazoline, 2-(2,6-dimethoxyphenyl)-4,4-dimethyl-2-oxazoline, 2-[1-(hydroxymethyl)ethyl] oxazoline, mixtures thereof, and derivatives thereof. In yet other approaches, the oxazoline or derivative thereof includes pendant groups in positions 2, 4, and 5 or combinations thereof wherein the pendant groups are selected from heterocyclic, aromatics, hydrocarbyl groups of $C_1$ to $C_{32}$, and mixtures thereof.

In some approaches, the lubricant additives herein may have a capping ratio of about 5 to about 70 percent of the primary and/or secondary amines (alkyl and/or aryl), in other approaches, about 5 to about 50 percent, and in yet further approaches, about 7 to about 35 percent capping. As used herein, a capping ratio is the percent of primary or secondary amines (alkyl and/or aryl) that have been capped or reacted with at least the oxazoline or derivative thereof. In some approaches, a molar ratio of the oxazoline or derivative thereof to active amines (that is primary and/or secondary alkyl or aryl amines) is about 5:1 to about 3:1, in other approaches, about 2:1 to about 1.5:1; and in yet further approaches, about 1:2 to about 1:4. In further approaches, a molar ratio of oxazoline to active amines is about 1:1. Percent capping is determined by measuring the nitrogen concentration of the polymer before and after the capping reaction using known nitrogen measurement techniques. In some approaches, the amines may also be capped with other compounds such as maleic anhydride and the like.

Definitions

As used herein, the term "effective concentration" refers to the concentration of the viscosity modifiers herein necessary for a sooted base oil to show Newtonian behavior, which indicates that the soot particles in the base oil are sufficiently dispersed. Effective concentration is determined by the methods described in the Examples. Additionally, effective concentration or tests to access soot dispersency are also described in U.S. Pat. No. 8,927,469 and US 2017/0335278, both of which are incorporated herein by reference.

As used herein, the term "olefin copolymer" refers to a random and/or block polymer comprised of two or more different types of monomers, wherein all monomers contain at least one olefin (carbon-carbon double bond).

As used herein, the term "amino acid" refers to a simple organic compound containing both a carboxyl (—COOH) and an amino (—NH$_2$) group. Unless specified otherwise, amino acids can contain other substituents, including additional carboxyl and/or amino groups.

For purposes of this disclosure, the chemical elements are identified in accordance with the Periodic Table of the Elements, CAS version, Handbook of Chemistry and Physics, 75th Ed. Additionally, general principles of organic chemistry are described in "Organic Chemistry", Thomas Sorrell, University Science Books, Sausolito: 1999, and "March's Advanced Organic Chemistry", 5th Ed., Ed.: Smith, M. B. and March, J., John Wiley & Sons, New York: 2001, the entire contents of which are hereby incorporated by reference.

As described herein, compounds may optionally be substituted with one or more substituents, such as are illustrated generally above, or as exemplified by particular classes, subclasses, and species of the disclosure.

As used herein, the term "hydrocarbyl or hydrocarbyl group" is a group with a carbon atom directly attached to a remainder of the molecule and each hydrocarbyl group is independently selected from hydrocarbon substituents, and substituted hydrocarbon substituents containing one or more of halo groups, hydroxyl groups, alkoxy groups, mercapto groups, nitro groups, nitroso groups, amino groups, sulfoxy groups, pyridyl groups, furyl groups, thienyl groups, imidazolyl groups, sulfur, oxygen and nitrogen, and wherein no more than two non-hydrocarbon substituents are present for every ten carbon atoms in the hydrocarbyl group.

As used herein the term "aliphatic" encompasses the terms alkyl, alkenyl, alkynyl, each of which being optionally substituted as set forth below.

As used herein, an "alkyl" group refers to a saturated aliphatic hydrocarbon group containing 1-12 (e.g., 1-8, 1-6, or 1-4) carbon atoms. An alkyl group can be straight or branched. Examples of alkyl groups include, but are not limited to, methyl, ethyl, propyl, isopropyl, butyl, isobutyl, sec-butyl, tert-butyl, n-pentyl, n-heptyl, or 2-ethylhexyl. An alkyl group can be substituted (i.e., optionally substituted) with one or more substituents such as halo, phospho, cycloaliphatic [e.g., cycloalkyl or cycloalkenyl], heterocycloaliphatic [e.g., heterocycloalkyl or heterocycloalkenyl], aryl, heteroaryl, alkoxy, aroyl, heteroaroyl, acyl [e.g., (aliphatic) carbonyl, (cycloaliphatic)carbonyl, or (heterocycloaliphatic) carbonyl], nitro, cyano, amido [e.g., (cycloalkylalkyl)carbonylamino, arylcarbonylamino, aralkylcarbonylamino, (heterocycloalkyl) carbonylamino, (heterocycloalkylalkyl) carbonylamino, heteroarylcarbonylamino, heteroaralkyl carbonylamino alkylaminocarbonyl, cycloalkylaminocarbonyl, heterocycloalkylaminocarbonyl, arylaminocarbonyl, or heteroarylaminocarbonyl], amino [e.g., aliphaticamino, cyclo aliphaticamino, or heterocycloaliphaticamino], sulfonyl [e.g., aliphatic-SO$_2$—], sulfinyl, sulfanyl, sulfoxy, urea, thiourea, sulfamoyl, sulfamide, oxo, carboxy, carbamoyl, cycloaliphaticoxy, heterocycloaliphaticoxy, aryloxy, heteroaryloxy, aralkyloxy, heteroarylalkoxy, alkoxycarbonyl, alkylcarbonyloxy, or hydroxy. Without limitation, some examples of substituted alkyls include carboxyalkyl (such as HOOC-alkyl, alkoxycarbonylalkyl, and alkylcarbonyloxyalkyl), cyanoalkyl, hydroxyalkyl, alkoxyalkyl, acylalkyl, aralkyl, (alkoxyaryl)alkyl, (sulfonylamino) alkyl (such as (alkyl-SO$_2$-amino)alkyl), aminoalkyl, amidoalkyl, (cycloaliphatic)alkyl, or haloalkyl.

As used herein, an "alkenyl" group refers to an aliphatic carbon group that contains 2-8 (e.g., 2-12, 2-6, or 2-4) carbon atoms and at least one double bond. Like an alkyl group, an alkenyl group can be straight or branched. Examples of an alkenyl group include, but are not limited to allyl, isoprenyl, 2-butenyl, and 2-hexenyl. An alkenyl group can be optionally substituted with one or more substituents such as halo, phospho, cycloaliphatic [e.g., cycloalkyl or cycloalkenyl], heterocycloaliphatic [e.g., heterocycloalkyl or hetero cycloalkenyl], aryl, heteroaryl, alkoxy, aroyl, heteroaroyl, acyl [e.g., (aliphatic) carbonyl, (cycloaliphatic) carbonyl, or (heterocycloaliphatic)carbonyl], nitro, cyano, amido [e.g., (cycloalkylalkyl)carbonylamino, arylcarbonylamino, aralkylcarbonylamino, (hetero cycloalkyl) carbonylamino, (heterocyclo alkylalkyl) carbonylamino, heteroarylcarbonylamino, heteroaralkylcarbonylamino alkylaminocarbonyl, cycloalkylaminocarbonyl, hetero cyclo alkylaminocarbonyl, arylamino arbonyl, or heteroarylaminocarbonyl], amino [e.g., aliphaticamino, cycloaliphaticamino, heterocycloaliphaticamino, or aliphaticsulfonylamino], sulfonyl [e.g., alkyl-$SO_2$—, cycloaliphatic-$SO_2$—, or aryl-$SO_2$—], sulfinyl, sulfanyl, sulfoxy, urea, thiourea, sulfamoyl, sulfamide, oxo, carboxy, carbamoyl, cycloaliphaticoxy, heterocycloaliphaticoxy, aryloxy, heteroaryloxy, aralkyloxy, heteroaralkoxy, alkoxycarbonyl, alkylcarbonyloxy, or hydroxy. Without limitation, some examples of substituted alkenyls include cyanoalkenyl, alkoxyalkenyl, acylalkenyl, hydroxyalkenyl, aralkenyl, (alkoxyaryl)alkenyl, (sulfonylamino)alkenyl (such as (alkyl-$SO_2$-amino)alkenyl), aminoalkenyl, amidoalkenyl, (cycloaliphatic)alkenyl, or haloalkenyl.

As used herein, an "alkynyl" group refers to an aliphatic carbon group that contains 2-8 (e.g., 2-12, 2-6, or 2-4) carbon atoms and has at least one triple bond. An alkynyl group can be straight or branched. Examples of an alkynyl group include, but are not limited to, propargyl and butynyl. An alkynyl group can be optionally substituted with one or more substituents such as aroyl, heteroaroyl, alkoxy, cycloalkyloxy, heterocycloalkyloxy, aryloxy, heteroaryloxy, aralkyloxy, nitro, carboxy, cyano, halo, hydroxy, sulfo, mercapto, sulfanyl [e.g., aliphaticsulfanyl or cycloaliphaticsulfanyl], sulfinyl [e.g., aliphaticsulfinyl or cycloaliphaticsulfinyl], sulfonyl [e.g., aliphatic-$SO_2$—, aliphaticamino-$SO_2$—, or cycloaliphatic-$SO_2$—], amido [e.g., aminocarbonyl, alkylaminocarbonyl, alkylcarbonylamino, cyclo alkylaminocarbonyl, heterocycloalkyl aminocarbonyl, cycloalkylcarbonylamino, arylamino carbonyl, arylcarbonylamino, aralkyl carbonyl amino, (heterocycloalkyl) carbonylamino, (cycloalkylalkyl)carbonylamino, heteroaralkylcarbonylamino, heteroaryl carbonylamino or heteroarylaminocarbonyl], urea, thiourea, sulfamoyl, sulfamide, alkoxycarbonyl, alkyl carbonyloxy, cycloaliphatic, heterocyclo aliphatic, aryl, heteroaryl, acyl [e.g., (cycloaliphatic) carbonyl or (heterocycloaliphatic)carbonyl], amino [e.g., aliphaticamino], sulfoxy, oxo, carboxy, carbamoyl, (cycloaliphatic)oxy, (hetero cyclo aliphatic) oxy, or (heteroaryl)alkoxy.

As used herein, an "amino" group refers to —$NR^XR^Y$ wherein each of $R^X$ and $R^Y$ is independently hydrogen, alkyl, cycloakyl, (cycloalkyl)alkyl, aryl, aralkyl, heterocycloalkyl, (heterocycloalkyl)alkyl, heteroaryl, carboxy, sulfanyl, sulfinyl, sulfonyl, (alkyl)carbonyl, (cycloalkyl) carbonyl, ((cycloalkyl)alkyl)carbonyl, arylcarbonyl, (aralkyl)carbonyl, (hetero cycloalkyl) carbonyl, ((heterocycloalkyl)alkyl)carbonyl, (heteroaryl)carbonyl, or (hetero aralkyl) carbonyl, each of which being defined herein and being optionally substituted. Examples of amino groups include alkylamino, dialkylamino, or arylamino. When the term "amino" is not the terminal group (e.g., alkylcarbonylamino), it is represented by —$NR^X$—. $R^X$ has the same meaning as defined above.

As used herein, a "cycloalkyl" group refers to a saturated carbocyclic mono- or bicyclic (fused or bridged) ring of 3-10 (e.g., 5-10) carbon atoms. Examples of cycloalkyl groups include cyclopropyl, cyclobutyl, cyclopentyl, cyclohexyl, cycloheptyl, adamantyl, norbornyl, cubyl, octahydroindenyl, decahydro-naphthyl, bicyclo[3.2.1]octyl, bicyclo [2.2.2] octyl, bicyclo[3.3.1]nonyl, bicyclo[3.3.2]decyl, bicyclo[2.2.2]octyl, adamantyl, or ((aminocarbonyl)cycloalkyl)cycloalkyl.

As used herein, a "heterocycloalkyl" group refers to a 3-10 membered mono- or bicylic (fused or bridged) (e.g., 5- to 10-membered mono- or bicyclic) saturated ring structure, in which one or more of the ring atoms is a heteroatom (e.g., N, O, S, or combinations thereof). Examples of a heterocycloalkyl group include piperidyl, piperazyl, tetrahydropyranyl, tetrahydrofuryl, 1,4-dioxolanyl, 1,4-dithianyl, 1,3-dioxolanyl, oxazolidyl, isoxazolidyl, morpholinyl, thiomorpholyl, octahydrobenzofuryl, octahydrochromenyl, octahydrothio chromenyl, octahydroindolyl, octahydropyrindinyl, decahydroquinolinyl, octahydrobenzo [b]thiopheneyl, 2-oxa-bicyclo[2.2.2]octyl, 1-aza-bicyclo[2.2.2]octyl, 3-aza-bicyclo[3.2.1]octyl, and 2,6-dioxa-tricyclo [3.3.1.0]nonyl. A monocyclic heterocycloalkyl group can be fused with a phenyl moiety to form structures, such as tetrahydroisoquinoline, which would be categorized as heteroaryl s.

A "heteroaryl" group, as used herein, refers to a monocyclic, bicyclic, or tricyclic ring system having 4 to 15 ring atoms wherein one or more of the ring atoms is a heteroatom (e.g., N, O, S, or combinations thereof) and in which the monocyclic ring system is aromatic or at least one of the rings in the bicyclic or tricyclic ring systems is aromatic. A heteroaryl group includes a benzofused ring system having 2 to 3 rings. For example, a benzofused group includes benzo fused with one or two 4 to 8 membered heterocycloaliphatic moieties (e.g., indolizyl, indolyl, isoindolyl, 3H-indolyl, indolinyl, benzo[b]furyl, benzo[b]thiophenyl, quinolinyl, or isoquinolinyl). Some examples of heteroaryl are pyridyl, 1H-indazolyl, furyl, pyrrolyl, thienyl, thiazolyl, oxazolyl, imidazolyl, tetrazolyl, benzofuryl, isoquinolinyl, benzthiazolyl, xanthene, thioxanthene, phenothiazine, dihydroindole, benzo[1,3]dioxole, benzo[b]furyl, benzo[b]thiophenyl, indazolyl, benzimidazolyl, benzthiazolyl, puryl, cinnolyl, quinolyl, quinazolyl, cinnolyl, phthalazyl, quinazolyl, quinoxalyl, isoquinolyl, 4H-quinolizyl, benzo-1,2,5-thiadiazolyl, or 1,8-naphthyridyl.

Without limitation, monocyclic heteroaryls include furyl, thiophenyl, 2H-pyrrolyl, pyrrolyl, oxazolyl, thazolyl, imidazolyl, pyrazolyl, isoxazolyl, isothiazolyl, 1,3,4-thiadiazolyl, 2H-pyranyl, 4-H-pranyl, pyridyl, pyridazyl, pyrimidyl, pyrazolyl, pyrazyl, or 1,3,5-triazyl. Monocyclic heteroaryls are numbered according to standard chemical nomenclature.

Without limitation, bicyclic heteroaryls include indolizyl, indolyl, isoindolyl, 3H-indolyl, indolinyl, benzo[b]furyl, benzo[b]thiophenyl, quinolinyl, isoquinolinyl, indolizinyl, isoindolyl, indolyl, benzo[b]furyl, bexo[b]thiophenyl, indazolyl, benzimidazyl, benzthiazolyl, purinyl, 4H-quinolizyl, quinolyl, isoquinolyl, cinnolyl, phthalazyl, quinazolyl, quinoxalyl, 1,8-naphthyridyl, or pteridyl. Bicyclic heteroaryls are numbered according to standard chemical nomenclature.

If used, the term "hydrocarbyl" refers to a group having a carbon atom directly attached to the remainder of the molecule and having predominantly hydrocarbon character. Examples of hydrocarbyl groups include: (1) hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form an alicyclic radical); (2) substituted hydrocarbon substituents, that is, substituents containing non-hydrocarbon groups which, in the context of the description herein, do not alter the predominantly hydrocarbon substituent (e.g., halo (especially chloro and fluoro), hydroxy, alkoxy, mercapto, alkylmercapto, nitro, nitroso, and sulfoxy); (3) hetero-substituents, that is, substituents which, while having a predominantly hydrocarbon character, in the context of this description, contain other than carbon in a ring or chain otherwise composed of carbon atoms. Hetero-atoms include sulfur, oxygen, nitrogen, and encompass substituents such as pyridyl, furyl, thienyl and imidazolyl. In general, no more than two, preferably no more than one, non-hydrocarbon substituent will be present for every ten carbon atoms in the hydrocarbyl group; typically, there will be no non-hydrocarbon substituents in the hydrocarbyl group. A "hydrocarbyl group" may also refers to a group that has a carbon atom directly attached to a remainder of the molecule and each hydrocarbyl group is independently selected from hydrocarbon substituents, and substituted hydrocarbon substituents may contain one or more of halo groups, hydroxyl groups, alkoxy groups, mercapto groups, nitro groups, nitroso groups, amino groups, sulfoxy groups, pyridyl groups, furyl groups, thienyl groups, imidazolyl groups, sulfur, oxygen and nitrogen, and wherein no more than two non-hydrocarbon substituents are present for every ten carbon atoms in the hydrocarbyl group.

The novel lubricant additives, such as the novel dispersant viscosity modifiers or lubricant dispersants described herein can be used as part of a lubricating oil composition. Accordingly, said lubricating oil compositions further comprise a base oil as described below. In some approaches, a lubricating oil may include about 0.1 to about 5 weight percent of the functionalized OCP polymers described in any of the preceding paragraphs on a solids basis.

Base Oil

The dispersant viscosity modifiers and/or dispersants of the present disclosure may be blended with a majority of base oil. Base oils suitable for use in formulating engine lubricant compositions and/or the metal working compositions (or other lubricating composition) may be selected from any of suitable synthetic oils, animal oils, vegetable oils, mineral oils or mixtures thereof. Animal oils and vegetable oils (e.g., lard oil, castor oil) as well as mineral lubricating oils such as liquid petroleum oils and solvent treated or acid-treated mineral lubricating oils of the paraffinic, naphthenic or mixed paraffinic-naphthenic types may be used. Oils derived from coal or shale may also be suitable. The base oil typically may have a viscosity of about 2 to about 15 cSt or, as a further example, about 2 to about 10 cSt at 100° C. Further, an oil derived from a gas-to-liquid process is also suitable.

Suitable synthetic base oils may include alkyl esters of dicarboxylic acids, polyglycols and alcohols, poly-alpha-olefins, including polybutenes, alkyl benzenes, organic esters of phosphoric acids, and polysilicone oils. Synthetic oils include hydrocarbon oils such as polymerized and interpolymerized olefins (e.g., polybutylenes, polypropylenes, propylene isobutylene copolymers, etc.); poly(1-hexenes), poly-(1-octenes), poly(1-decenes), etc. and mixtures thereof; alkylbenzenes (e.g., dodecylbenzenes, tetradecylbenzenes, di-nonylbenzenes, di-(2-ethylhexyl)benzenes, etc.); polyphenyls (e.g., biphenyls, terphenyl, alkylated polyphenyls, etc.); alkylated diphenyl ethers and alkylated diphenyl sulfides and the derivatives, analogs and homologs thereof and the like.

Alkylene oxide polymers and interpolymers and derivatives thereof where the terminal hydroxyl groups have been modified by esterification, etherification, etc., constitute another class of known synthetic oils that may be used. Such oils are exemplified by the oils prepared through polymerization of ethylene oxide or propylene oxide, the alkyl and aryl ethers of these polyoxyalkylene polymers (e.g., methyl-polyisopropylene glycol ether having an average molecular weight of about 1000, diphenyl ether of polyethylene glycol having a molecular weight of about 500-1000, diethyl ether of polypropylene glycol having a molecular weight of about 1000-1500, etc.) or mono- and polycarboxylic esters thereof, for example, the acetic acid esters, mixed $C_3$-$C_8$ fatty acid esters, or the C13 oxo-acid diester of tetraethylene glycol.

Another class of synthetic oils that may be used includes the esters of dicarboxylic acids (e.g., phthalic acid, succinic acid, alkyl succinic acids, alkenyl succinic acids, maleic acid, azelaic acid, suberic acid, sebacic acid, fumaric acid, adipic acid, linoleic acid dimer, malonic acid, alkyl malonic acids, alkenyl malonic acids, etc.) with a variety of alcohols (e.g., butyl alcohol, hexyl alcohol, dodecyl alcohol, 2-ethylhexyl alcohol, ethylene glycol, diethylene glycol monoether, propylene glycol, etc.) Specific examples of these esters include dibutyl adipate, di(2-ethylhexyl)sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethylhexanoic acid and the like.

Esters useful as synthetic oils also include those made from C5 to C12 monocarboxylic acids and polyols and polyol ethers such as neopentyl glycol, trimethylol propane, pentaerythritol, dipentaerythritol, tripentaerythritol, etc.

Hence, the base oil used which may be used to make the engine and/or metalworking lubricant compositions as described herein may be selected from any of the base oils in Groups I-V as specified in the American Petroleum Institute (API) Base Oil Interchangeability Guidelines. Such base oil groups are as follows:

TABLE 1

| Base Oil Group[1] | Sulfur (wt %) | | Saturates (wt. %) | Viscosity Index |
|---|---|---|---|---|
| Group I | >0.03 | And/or | <90 | 80 to 120 |
| Group II | ≤0.03 | And | ≥90 | 80 to 120 |
| Group III | ≤0.03 | And | ≥90 | ≥120 |
| Group IV | | all polyalphaolefins (PAOs) | | |
| Group V | | all others not included in Groups I-IV | | |

[1]Groups I-III are mineral oil base stocks.

The base oil may contain a minor or major amount of a poly-alpha-olefin (PAO). Typically, the poly-alpha-olefins are derived from monomers having from about 4 to about 30, or from about 4 to about 20, or from about 6 to about 16 carbon atoms. Examples of useful PAOs include those derived from octene, decene, mixtures thereof, and the like. PAOs may have a viscosity of from about 2 to about 15, or from about 3 to about 12, or from about 4 to about 8 cSt at 100° C. Examples of PAOs include 4 cSt at 100° C. poly-alpha-olefins, 6 cSt at 100° C. poly-alpha-olefins, and mixtures thereof. Mixtures of mineral oil with the foregoing poly-alpha-olefins may be used.

The base oil may be an oil derived from Fischer-Tropsch synthesized hydrocarbons. Fischer-Tropsch synthesized hydrocarbons are made from synthesis gas containing $H_2$ and CO using a Fischer-Tropsch catalyst. Such hydrocarbons typically require further processing in order to be useful as the base oil. For example, the hydrocarbons may be hydroisomerized using processes disclosed in U.S. Pat. No. 6,103,099 or 6,180,575; hydrocracked and hydroisomerized using processes disclosed in U.S. Pat. No. 4,943,672 or 6,096,940; dewaxed using processes disclosed in U.S. Pat. No. 5,882,505; or hydroisomerized and dewaxed using processes disclosed in U.S. Pat. Nos. 6,013,171; 6,080,301; or 6,165,949.

Unrefined, refined, and rerefined oils, either natural or synthetic (as well as mixtures of two or more of any of these) of the type disclosed hereinabove can be used in the base oils. Unrefined oils are those obtained directly from a natural or synthetic source without further purification treatment. For example, a shale oil obtained directly from retorting operations, a petroleum oil obtained directly from primary distillation or ester oil obtained directly from an esterification process and used without further treatment would be an unrefined oil. Refined oils are similar to the unrefined oils except they have been further treated in one or more purification steps to improve one or more properties. Many such purification techniques are known to those skilled in the art such as solvent extraction, secondary distillation, acid or base extraction, filtration, percolation, etc. Rerefined oils are obtained by processes similar to those used to obtain refined oils applied to refined oils which have been already used in service. Such rerefined oils are also known as reclaimed or reprocessed oils and often are additionally processed by techniques directed to removal of spent additives, contaminants, and oil breakdown products.

The base oil may be combined with the emulsifying agent described herein along with optional additives to provide an engine lubricant composition. Accordingly, the base oil may be present in the engine lubricant composition in a major amount ranging from about 50 wt. % to about 95 wt. % based on a total weight of the lubricant composition.

Other optional additives of the lubricating oils are described below.

Metal-Containing Detergents

Metal detergents that may be used with the dispersant reaction product described above generally comprise a polar head with a long hydrophobic tail where the polar head comprises a metal salt of an acidic organic compound. The salts may contain a substantially stoichiometric amount of the metal, in which case they are usually described as normal or neutral salts, and would typically have a total base number or TBN (as measured by ASTM D2896) of from about 0 to less than about 150. Large amounts of a metal base may be included by reacting an excess of a metal compound such as an oxide or hydroxide with an acidic gas such as carbon dioxide. The resulting overbased detergent comprises micelles of neutralized detergent surrounding a core of inorganic metal base (e.g., hydrated carbonates). Such overbased detergents may have a TBN of about 150 or greater, such as from about 150 to about 450 or more.

Detergents that may be suitable for use in the present embodiments include oil-soluble overbased, low base, and neutral sulfonates, phenates, sulfurized phenates, and salicylates of a metal, particularly the alkali or alkaline earth metals, e.g., sodium, potassium, lithium, calcium, and magnesium. More than one metal may be present, for example, both calcium and magnesium. Mixtures of calcium and/or magnesium with sodium may also be suitable. Suitable metal detergents may be overbased calcium or magnesium sulfonates having a TBN of from 150 to 450 TBN, overbased calcium or magnesium phenates or sulfurized phenates having a TBN of from 150 to 300 TBN, and overbased calcium or magnesium salicylates having a TBN of from 130 to 350. Mixtures of such salts may also be used.

The metal-containing detergent may be present in a lubricating composition in an amount of from about 0.5 wt % to about 5 wt %. As a further example, the metal-containing detergent may be present in an amount of from about 1.0 wt % to about 3.0 wt %. The metal-containing detergent may be present in a lubricating composition in an amount sufficient to provide from about 500 to about 5000 ppm alkali and/or alkaline earth metal to the lubricant composition based on a total weight of the lubricant composition. As a further example, the metal-containing detergent may be present in a lubricating composition in an amount sufficient to provide from about 1000 to about 3000 ppm alkali and/or alkaline earth metal.

Phosphorus-Based Anti-Wear Agents

Phosphorus-based wear preventative agents may be used and may comprise a metal dihydrocarbyl dithiophosphate compound, such as but not limited to a zinc dihydrocarbyl dithiophosphate compound. Suitable metal dihydrocarbyl dithiophosphates may comprise dihydrocarbyl dithiophosphate metal salts wherein the metal may be an alkali or alkaline earth metal, or aluminum, lead, tin, molybdenum, manganese, nickel, copper, or zinc.

Dihydrocarbyl dithiophosphate metal salts may be prepared in accordance with known techniques by first forming a dihydrocarbyl dithiophosphoric acid (DDPA), usually by reaction of one or more alcohol or a phenol with $P_2S_5$ and then neutralizing the formed DDPA with a metal compound. For example, a dithiophosphoric acid may be made by reacting mixtures of primary and secondary alcohols. Alternatively, multiple dithiophosphoric acids can be prepared where the hydrocarbyl groups on one are entirely secondary in character and the hydrocarbyl groups on the others are entirely primary in character. To make the metal salt, any basic or neutral metal compound could be used but the oxides, hydroxides and carbonates are most generally employed. Commercial additives frequently contain an excess of metal due to the use of an excess of the basic metal compound in the neutralization reaction.

The zinc dihydrocarbyl dithiophosphates (ZDDP) are oil soluble salts of dihydrocarbyl dithiophosphoric acids and may be represented by the following formula:

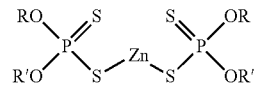

wherein R and R' may be the same or different hydrocarbyl radicals containing from 1 to 18, for example 2 to 12, carbon atoms and including radicals such as alkyl, alkenyl, aryl, arylalkyl, alkaryl, and cycloaliphatic radicals. R and R' groups may be alkyl groups of 2 to 8 carbon atoms. Thus, the radicals may, for example, be ethyl, n-propyl, i-propyl, n-butyl, i-butyl, sec-butyl, amyl, n-hexyl, i-hexyl, n-octyl, decyl, dodecyl, octadecyl, 2-ethylhexyl, phenyl, butylphenyl, cyclohexyl, methylcyclopentyl, propenyl, butenyl. In order to obtain oil solubility, the total number of carbon atoms (i.e., R and R') in the dithiophosphoric acid will generally be about 5 or greater. The zinc dihydrocarbyl dithiophosphate can therefore comprise zinc dialkyl dithiophosphates.

Other suitable components that may be utilized as the phosphorus-based wear preventative include any suitable organophosphorus compound, such as but not limited to, phosphates, thiophosphates, di-thiophosphates, phosphites, and salts thereof and phosphonates. Suitable examples are tricresyl phosphate (TCP), di-alkyl phosphite (e.g., dibutyl hydrogen phosphite), and amyl acid phosphate.

Another suitable component is a phosphorylated succinimide such as a completed reaction product from a reaction between a hydrocarbyl substituted succinic acylating agent and a polyamine combined with a phosphorus source, such as inorganic or organic phosphorus acid or ester. Further, it may comprise compounds wherein the product may have amide, amidine, and/or salt linkages in addition to the imide linkage of the type that results from the reaction of a primary amino group and an anhydride moiety.

The phosphorus-based wear preventative may be present in a lubricating composition in an amount sufficient to provide from about 200 to about 2000 ppm phosphorus. As a further example, the phosphorus-based wear preventative may be present in a lubricating composition in an amount sufficient to provide from about 500 to about 800 ppm phosphorus.

The phosphorus-based wear preventative may be present in a lubricating composition in an amount sufficient to provide a ratio of alkali and/or alkaline earth metal content (ppm) based on the total amount of alkali and/or alkaline earth metal in the lubricating composition to phosphorus content (ppm) based on the total amount of phosphorus in the lubricating composition of from about 1.6 to about 3.0 (ppm/ppm).

Friction Modifiers

Embodiments of the present disclosure may include one or more friction modifiers. Suitable friction modifiers may comprise metal containing and metal-free friction modifiers and may include, but are not limited to, imidazolines, amides, amines, succinimides, alkoxylated amines, alkoxylated ether amines, amine oxides, amidoamines, nitriles, betaines, quaternary amines, imines, amine salts, amino guanadine, alkanolamides, phosphonates, metal-containing compounds, glycerol esters, and the like.

Suitable friction modifiers may contain hydrocarbyl groups that are selected from straight chain, branched chain, or aromatic hydrocarbyl groups or admixtures thereof, and may be saturated or unsaturated. The hydrocarbyl groups may be composed of carbon and hydrogen or hetero atoms such as sulfur or oxygen. The hydrocarbyl groups may range from about 12 to about 25 carbon atoms and may be saturated or unsaturated.

Aminic friction modifiers may include amides of polyamines. Such compounds can have hydrocarbyl groups that are linear, either saturated or unsaturated, or a mixture thereof and may contain from about 12 to about 25 carbon atoms.

Further examples of suitable friction modifiers include alkoxylated amines and alkoxylated ether amines. Such compounds may have hydrocarbyl groups that are linear, either saturated, unsaturated, or a mixture thereof. They may contain from about 12 to about 25 carbon atoms. Examples include ethoxylated amines and ethoxylated ether amines.

The amines and amides may be used as such or in the form of an adduct or reaction product with a boron compound such as a boric oxide, boron halide, metaborate, boric acid or a mono-, di- or tri-alkyl borate. Other suitable friction modifiers are described in U.S. Pat. No. 6,300,291, herein incorporated by reference.

Other suitable friction modifiers may include an organic, ashless (metal-free), nitrogen-free organic friction modifier. Such friction modifiers may include esters formed by reacting carboxylic acids and anhydrides with alkanols. Other useful friction modifiers generally include a polar terminal group (e.g. carboxyl or hydroxyl) covalently bonded to an oleophilic hydrocarbon chain. Esters of carboxylic acids and anhydrides with alkanols are described in U.S. Pat. No. 4,702,850. Another example of an organic ashless nitrogen-free friction modifier is known generally as glycerol monooleate (GMO) which may contain mono- and diesters of oleic acid. Other suitable friction modifiers are described in U.S. Pat. No. 6,723,685, herein incorporated by reference. The ashless friction modifier may be present in the lubricant composition in an amount ranging from about 0.1 to about 0.4 percent by weight based on a total weight of the lubricant composition.

Suitable friction modifiers may also include one or more molybdenum compounds. The molybdenum compound may be selected from the group consisting of molybdenum dithiocarbamates (MoDTC), molybdenum dithiophosphates, molybdenum dithiophosphinates, molybdenum xanthates, molybdenum thioxanthates, molybdenum sulfides, a trinuclear organo-molybdenum compound, molybdenum/amine complexes, and mixtures thereof.

Additionally, the molybdenum compound may be an acidic molybdenum compound. Included are molybdic acid, ammonium molybdate, sodium molybdate, potassium molybdate, and other alkaline metal molybdates and other molybdenum salts, e.g., hydrogen sodium molybdate, $MoOCl_4$, $MoO_2Br_2$, $Mo_2O_3Cl_6$, molybdenum trioxide or similar acidic molybdenum compounds. Alternatively, the compositions can be provided with molybdenum by molybdenum/sulfur complexes of basic nitrogen compounds as described, for example, in U.S. Pat. Nos. 4,263,152; 4,285,822; 4,283,295; 4,272,387; 4,265,773; 4,261,843; 4,259,195 and 4,259,194; and WO 94/06897.

Suitable molybdenum dithiocarbamates may be represented by the formula:

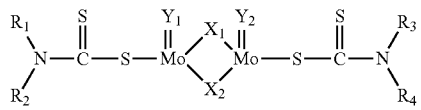

where $R_1$, $R_2$, $R_3$, and $R_4$ each independently represent a hydrogen atom, a $C_1$ to $C_{20}$ alkyl group, a $C_6$ to $C_{20}$ cycloalkyl, aryl, alkylaryl, or aralkyl group, or a $C_3$ to $C_{20}$ hydrocarbyl group containing an ester, ether, alcohol, or carboxyl group; and $X_1$, $X_2$, $Y_1$, and $Y_2$ each independently represent a sulfur or oxygen atom.

Examples of suitable groups for each of $R_1$, $R_2$, $R_3$, and $R_4$ include 2-ethylhexyl, nonylphenyl, methyl, ethyl, n-propyl, iso-propyl, n-butyl, t-butyl, n-hexyl, n-octyl, nonyl, decyl, dodecyl, tridecyl, lauryl, oleyl, linoleyl, cyclohexyl and phenylmethyl. $R_1$ to $R_4$ may each have $C_6$ to $C_{18}$ alkyl groups. $X_1$ and $X_2$ may be the same, and $Y_1$ and $Y_2$ may be the same. $X_1$ and $X_2$ may both comprise sulfur atoms, and $Y_1$ and $Y_2$ may both comprise oxygen atoms.

Further examples of molybdenum dithiocarbamates include $C_6$-$C_{18}$ dialkyl or diaryldithiocarbamates, or alkyl-aryldithiocarbamates such as dibutyl-, diamyl-di-(2-ethylhexyl)-, dilauryl-, dioleyl-, and dicyclohexyl-dithiocarbamate.

Another class of suitable organo-molybdenum compounds are trinuclear molybdenum compounds, such as those of the formula $Mo_3S_kL_nQ_z$ and mixtures thereof, wherein L represents independently selected ligands having organo groups with a sufficient number of carbon atoms to render the compound soluble or dispersible in the oil, n is from 1 to 4, k varies from 4 through 7, Q is selected from the group of neutral electron donating compounds such as water, amines, alcohols, phosphines, and ethers, and z ranges from 0 to 5 and includes non-stoichiometric values. At least 21 total carbon atoms may be present among all the ligands' organo groups, such as at least 25, at least 30, or at least 35 carbon atoms. Additional suitable molybdenum compounds are described in U.S. Pat. No. 6,723,685, herein incorporated by reference.

The molybdenum compound may be present in a fully formulated engine lubricant in an amount to provide about 5 ppm to 500 ppm by weight molybdenum. As a further example, the molybdenum compound may be present in an amount to provide about 50 to 300 ppm by weight molybdenum. A particularly suitable amount of molybdenum compound may be an amount sufficient to provide from about 60 to about 250 ppm by weight molybdenum to the lubricant composition.

Anti-Foam Agents

In some embodiments, a foam inhibitor may form another component suitable for use in the compositions. Foam inhibitors may be selected from silicones, polyacrylates, and the like. The amount of antifoam agent in the engine lubricant formulations described herein may range from about 0.001 wt % to about 0.1 wt % based on the total weight of the formulation. As a further example, antifoam agent may be present in an amount from about 0.004 wt. % to about 0.008 wt. %.

Oxidation Inhibitor Components

Oxidation inhibitors or antioxidants reduce the tendency of base stocks to deteriorate in service which deterioration can be evidenced by the products of oxidation such as sludge and varnish-like deposits that deposit on metal surfaces and by viscosity growth of the finished lubricant. Such oxidation inhibitors include hindered phenols, sulfurized hindered phenols, alkaline earth metal salts of alkylphenolthioesters having C5 to C12 alkyl side chains, sulfurized alkylphenols, metal salts of either sulfurized or nonsulfurized alkylphenols, for example calcium nonylphenol sulfide, ashless oil soluble phenates and sulfurized phenates, phosphosulfurized or sulfurized hydrocarbons, phosphorus esters, metal thiocarbamates, and oil soluble copper compounds as described in U.S. Pat. No. 4,867,890.

Other antioxidants that may be used include sterically hindered phenols and esters thereof, diarylamines, alkylated phenothiazines, sulfurized compounds, and ashless dialkyl dithiocarbamates. Non-limiting examples of sterically hindered phenols include, but are not limited to, 2,6-di-tertiary butylphenol, 2,6 di-tertiary butyl methylphenol, 4-ethyl-2,6-di-tertiary butylphenol, 4-propyl-2,6-di-tertiary butylphenol, 4-butyl-2,6-di-tertiary butylphenol, 4-pentyl-2,6-di-tertiary butylphenol, 4-hexyl-2,6-di-tertiary butylphenol, 4-heptyl-2,6-di-tertiary butyl phenol, 4-(2-ethylhexyl)-2,6-di-tertiary butylphenol, 4-octyl-2,6-di-tertiary butylphenol, 4-nonyl-2,6-di-tertiary butylphenol, 4-decyl-2,6-di-tertiary butylphenol, 4-undecyl-2,6-di-tertiary butyl phenol, 4-dodecyl-2,6-di-tertiary butylphenol, methylene bridged sterically hindered phenols including but not limited to 4,4-methylenebis(6-tert-butyl-o-cresol), 4,4-methylenebis(2-tert-amyl-o-cresol), 2,2-methylenebis(4-methyl-6 tert-butylphenol, 4,4-methylene-bis(2,6-di-tert-butylphenol) and mixtures thereof as described in U.S Publication No. 2004/0266630.

Diarylamine antioxidants include, but are not limited to diarylamines having the formula:

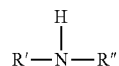

wherein R' and R" each independently represents a substituted or unsubstituted aryl group having from 6 to 30 carbon atoms. Illustrative of substituents for the aryl group include aliphatic hydrocarbon groups such as alkyl having from 1 to 30 carbon atoms, hydroxy groups, halogen radicals, carboxylic acid or ester groups, or nitro groups.

The aryl group is preferably substituted or unsubstituted phenyl or naphthyl, particularly wherein one or both of the aryl groups are substituted with at least one alkyl having from 4 to 30 carbon atoms, preferably from 4 to 18 carbon atoms, most preferably from 4 to 9 carbon atoms. It is preferred that one or both aryl groups be substituted, e.g. mono-alkylated diphenylamine, di-alkylated diphenylamine, or mixtures of mono- and di-alkylated diphenylamines.

The diarylamines may be of a structure containing more than one nitrogen atom in the molecule. Thus the diarylamine may contain at least two nitrogen atoms wherein at least one nitrogen atom has two aryl groups attached thereto, e.g. as in the case of various diamines having a secondary nitrogen atom as well as two aryls on one of the nitrogen atoms.

Examples of diarylamines that may be used include, but are not limited to: diphenyl amine; various alkylated diphenylamines; 3-hydroxydiphenylamine; N-phenyl-1,2-phenylene diamine; N-phenyl-1,4-phenylenediamine; monobutyldiphenyl-amine; dibutyl diphenylamine; monooctyl diphenylamine; dioctyldiphenylamine; monononyl diphenylamine; dinonyl diphenylamine; monotetradecyldiphenylamine; ditetradecyl diphenylamine, phenyl-alpha-naphthylamine; monooctyl phenyl-alpha-naphthylamine; phenyl-beta-naphthylamine; mono heptyl diphenylamine; diheptyl-diphenylamine; p-oriented styrenated diphenylamine; mixed butyloctyldi-phenylamine; and mixed octylstyryldiphenylamine.

The sulfur containing antioxidants include, but are not limited to, sulfurized olefins that are characterized by the type of olefin used in their production and the final sulfur content of the antioxidant. High molecular weight olefins, i.e. those olefins having an average molecular weight of 168 to 351 g/mole, are preferred. Examples of olefins that may be used include alpha-olefins, isomerized alpha-olefins, branched olefins, cyclic olefins, and combinations of these.

Alpha-olefins include, but are not limited to, any C4 to C25 alpha-olefins. Alpha-olefins may be isomerized before the sulfurization reaction or during the sulfurization reaction. Structural and/or conformational isomers of the alpha olefin that contain internal double bonds and/or branching may also be used. For example, isobutylene is a branched olefin counterpart of the alpha-olefin 1-butene.

Sulfur sources that may be used in the sulfurization reaction of olefins include: elemental sulfur, sulfur monochloride, sulfur dichloride, sodium sulfide, sodium polysulfide, and mixtures of these added together or at different stages of the sulfurization process.

Unsaturated oils, because of their unsaturation, may also be sulfurized and used as an antioxidant. Examples of oils or fats that may be used include corn oil, canola oil, cottonseed oil, grapeseed oil, olive oil, palm oil, peanut oil, coconut oil, rapeseed oil, safflower seed oil, sesame seed oil, soybean oil, sunflower seed oil, tallow, and combinations of these.

The amount of sulfurized olefin or sulfurized fatty oil delivered to the finished lubricant is based on the sulfur content of the sulfurized olefin or fatty oil and the desired level of sulfur to be delivered to the finished lubricant. For example, a sulfurized fatty oil or olefin containing 20 wt. % sulfur, when added to the finished lubricant at a 1.0 wt. % treat level, will deliver 2000 ppm of sulfur to the finished lubricant. A sulfurized fatty oil or olefin containing 10 wt. % sulfur, when added to the finished lubricant at a 1.0 wt. % treat level, will deliver 1000 ppm sulfur to the finished lubricant. It is desirable that the sulfurized olefin or sulfurized fatty oil to deliver between 200 ppm and 2000 ppm sulfur to the finished lubricant.

A suitable engine lubricant may include additive components in the ranges listed in Table 2 with broad and narrower ranges. Base oil makes up the balance of the lubricant.

TABLE 2

| Component | Wt. % | Wt. % |
| --- | --- | --- |
| Novel dispersant viscosity modifier and/or dispersant* | 0.1 to 5 | 0.3 to 2 |
| Additional Dispersants | 0-10 | 1-6 |
| Antioxidants | 0-5 | 0.01-3 |
| Metal Detergents | 0-15 | 0.1-8 |
| Corrosion Inhibitor | 0-5 | 0-2 |
| Metal dihydrocarbyl dithiophosphate | 0-6 | 0.1-4 |
| Ash-free amine phosphate salt | 0-6 | 0.0-4 |
| Antifoaming agents | 0-5 | 0.001-0.15 |
| Antiwear agents | 0-1 | 0-0.8 |
| Pour point depressant | 0-5 | 0.01-1.5 |
| Viscosity modifier | 0-20 | 0.25-10 |
| Friction modifiers | 0-2 | 0.1-1 |

*based on a solid polymer basis

Additional optional additives that may be included in lubricant compositions described herein include, but are not limited to, rust inhibitors, emulsifiers, demulsifiers, and oil-soluble titanium-containing additives.

Additives used in formulating the compositions described herein may be blended into the base oil individually or in various sub-combinations. However, it may be suitable to blend all of the components concurrently using an additive concentrate (i.e., additives plus a diluent, such as a hydrocarbon solvent). The use of an additive concentrate may take advantage of the mutual compatibility afforded by the combination of ingredients when in the form of an additive concentrate. Also, the use of a concentrate may reduce blending time and may lessen the possibility of blending errors.

The present disclosure provides novel lubricating oil blends specifically formulated for use as automotive engine lubricants. Embodiments of the present disclosure may provide lubricating oils suitable for engine applications that provide improvements in one or more of the following characteristics: antioxidancy, antiwear performance, rust inhibition, fuel economy, water tolerance, air entrainment, seal protection, and foam reducing properties.

A better understanding of the present disclosure and its many advantages may be clarified with the following examples. The following examples are illustrative and not limiting thereof in either scope or spirit. Those skilled in the art will readily understand that variations of the components, methods, steps, and devices described in these examples can be used. Unless noted otherwise or apparent from the context of discussion, all percentages, ratios, and parts noted in this disclosure are by weight.

EXAMPLES

Materials and Methods

Unless otherwise apparent from the content of the discussions, the reactions described herein were generally performed in a 500 mL, 4 neck resin kettle equipped with a heating mantle, a pitched 3 blade overhead stirrer, a thermocouple, a nitrogen inlet, a nitrogen outlet and condenser.

Starting Material:

"Maleated OCP-1" is an ethylene-propylene copolymer, grafted with maleic anhydride (maleation level is about 2.0 wt %) using known methods such as described in U.S. Pat. No. 6,107,257 (Mn=75,000 g/mol, Mw=150,000 g/mol). "Maleated OCP-2" is an ethylene-propylene copolymer, grafted with maleic anhydride (maleation level is about 2.0 wt %) using known methods such as described in U.S. Pat. No. 6,107,257 (Mn=40,000 g/mol, Mw=80,000 g/mol). U.S. Pat. No. 6,107,257 is incorporated herein by reference.

General Synthetic Strategy for Amino Acid Functionalized Acylated Olefin Copolymers The dispersant olefin copolymer viscosity modifiers of the present disclosure can be prepared by the procedure described in exemplary Scheme 1 below. Specifically, an olefin copolymer is grafted with an acylating agent (for example, maleic anhydride (Sigma Aldrich)). The acyl grafting may be accomplished with an appropriate technique known in the art, e.g. as described in U.S. Pat. No. 6,107,257. The grafted acid or anhydride can then undergo coupling chemistry (in the case of an acid) or a dehydration reaction (in the case of an anhydride) with an amino acid as described herein and shown in exemplary Scheme 1, wherein $R_1$ is methylene and $R_2$ is defined herein. The amino acid functionalization reaction can be accomplished in the presence of a solvent, such as a base oil.

Further or supplemental functionalization of the above formed amino acid grafted copolymer can be accomplished by coupling the carboxylic group of the amino acid with a polyamine or other functionalization agent. (The polyamine is shown only as an example in Scheme 1 below.) For the sake of clarity, and without limiting the disclosure in any way, Scheme 1 shows that further functionalization can be accomplished with N-phenyl-p-phenylenediamine (NPPDA). As can easily be envisaged by one having skill in the art, a wide variety of polyamines or other agents can be used for further functionalization of the amino acid grafted copolymer. Polyamines for further functionalization of the copolymer are described herein, and do not represent every possible polyamine that could be used for this purpose, and are therefore not meant to limit the disclosure. The polyamine functionalization reaction can also be accomplished in the presence of a solvent, such as a base oil. The functionalized polyamines can then be optionally capped with an oxazoline (available from Sigma Aldrich) of Formula IV, wherein $R_{13}$, $R_{14}$, and $R_{15}$ are defined herein and generally shown in Scheme 1 below. Oxazolines for further functionalization of the polyamines of the copolymer are described herein, and do not represent every possible oxazoline that could be used for this purpose, and are therefore also not meant to limit the disclosure.

Scheme 1: General Synthetic Strategy for the Synthesis of Amino Acid Functionalized Dispersant Viscosity Modifiers

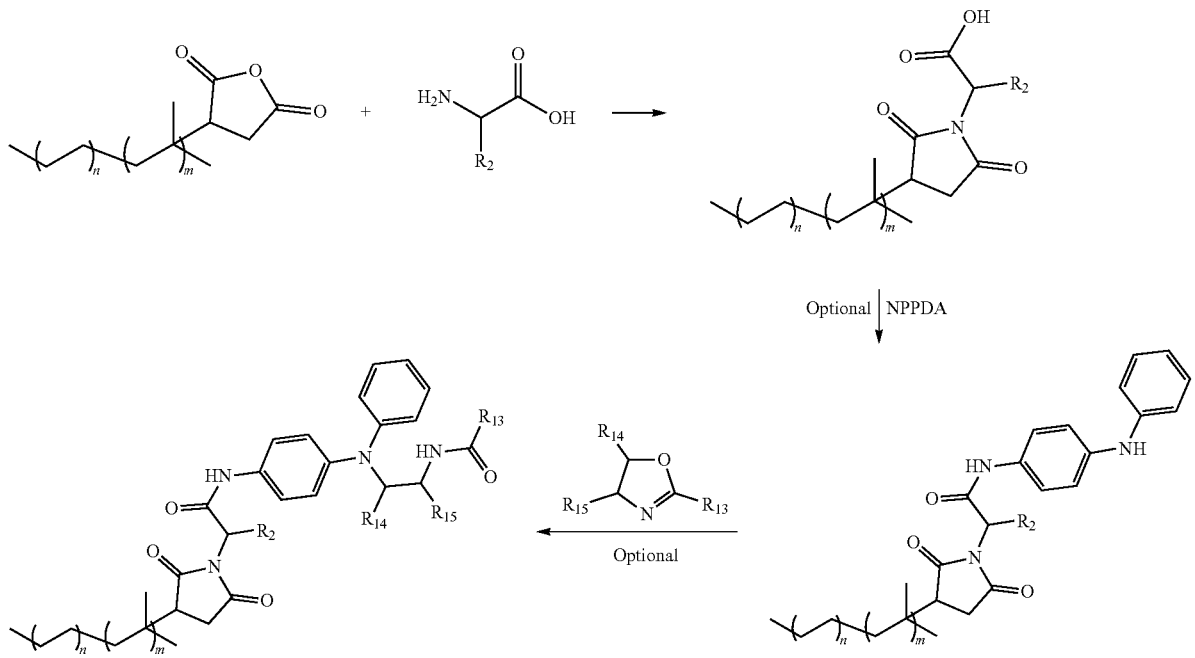

Example 1

This Example describes the addition of phenylalanine to an Acylated Olefin Copolymer. To a 500 mL, 4-neck resin kettle equipped with a heating mantle, a pitched 3 blade overhead stirrer, a thermocouple, a nitrogen inlet, a nitrogen outlet and condenser, was added Maleated OCP-1 (36.0 g), and Phillips 66 110N base oil (253.54 g). The reaction was heated to 150° C. at a constant stir rate of 300 rpm and under active nitrogen flow for 9 hours to allow complete dissolution of the polymer. The mixture was then maintained at 120° C. with 120 rpm stirring overnight under constant nitrogen flow. The following day, the temperature was increased to 130° C. then phenylalanine (1.46 g, 8.84 mmols) and surfonic L24-2 (9.0 g) were added. After 3 hours the reaction's temperature was raised and held at 165° C. for an additional 3 hours. The reaction was allowed to cool to 130° C. and then filtered through a 100 mesh (140 μm) filter. The product was then allowed to cool to room temperature.

Example 2

This example describes the capping of Phenylalanine and NPPDA to an Acylated Olefin Copolymer. To a 500 mL, 4 neck resin kettle equipped with a heating mantle, a pitched 3 blade overhead stirrer, a thermocouple, a nitrogen inlet, nitrogen outlet and condenser was added Maleated OCP-1 (36.0 g), and Phillips 66 110N base oil (251.92 g). The reaction was heated to 150° C. at a constant stir rate of 300 rpm and under active nitrogen flow for 9 hours to allow complete polymer dissolution. The mixture was then maintained at 120° C. with 120 rpm stirring overnight under constant nitrogen flow. The following day, the temperature was increased to 130° C. then Phenylalanine (1.46 g, 8.83 mmols) and surfonic L24-2 (9.0 g) were added. After 3 hours the reaction's temperature was raised to 165° C., then NPPDA (1.62 g, 8.79 mmols) was added, and the reaction was held for an additional 3 hours. The reaction was allowed to cool to 130° C., filtered through a 100 mesh (140 μm) filter, and then cooled to room temperature.

Example 3

This Example describes the capping of Tryptophan and NPPDA to an Acylated Olefin Copolymer. To a 500 mL, 4 neck resin kettle equipped with a heating mantle, a pitched 3 blade overhead stirrer, a thermocouple, a nitrogen inlet, nitrogen outlet and condenser was added Maleated OCP-1 (36 g), and Phillips 66 110N base oil (251.58 g). The reaction was heated to 150° C. at a constant stir rate of 300 rpm and under active nitrogen flow for 9 hours to allow complete polymer dissolution. The mixture was then maintained at 120° C. with 120 rpm stirring overnight under constant nitrogen flow. The following day, the temperature was increased to 130° C. and tryptophan (1.8 g, 8.81 mmols) and surfonic L24-2 (9.0 g) were added. After 3 hours the reaction's temperature was raised to 165° C., then NPPDA (1.62 g, 8.79 mmols) was added, and the reaction was held for an additional 3 hours. The reaction was allowed to cool to 130° C., filtered through a 100 mesh (140 μm) filter, and then cooled to room temperature.

Example 4

This Example describes the capping of Glutamic Acid and NPPDA to an Acylated Olefin Copolymer. To a 500 mL, 4 neck resin kettle equipped with a heating mantle, a pitched 3 blade overhead stirrer, a thermocouple, a nitrogen inlet, nitrogen outlet and condenser was added Maleated OCP-1 (36 g), and Phillips 66 110N base oil (250.85 g). The reaction was heated to 150° C. at a constant stir rate of 300 rpm and under active nitrogen flow for 9 hours to allow complete polymer dissolution. The mixture was then maintained at 120° C. with 120 rpm stirring overnight under constant nitrogen flow. The following day, the temperature was increased to 130° C. and Glutamic Acid (1.17 g, 7.95 mmols) and surfonic L24-2 (9.0 g) were added. After 3 hours the reaction's temperature was raised to 165° C., then NPPDA (2.97 g, 16.12 mmols) was added, and the reaction was held for an additional 3 hours. The reaction was allowed to cool to 130° C., filtered through a 100 mesh (140 μm) filter, and then cooled to room temperature.

Example 5

This Example describes the capping of Tryptophan and NPPDA to an acylated olefin copolymer, and then post-treating with oxazoline. To a 500 mL, 4 neck resin kettle equipped with a heating mantle, a pitched 3 blade overhead stirrer, a thermocouple, a nitrogen inlet, nitrogen outlet and condenser was added Maleated OCP-1 (36 g), and Phillips 66 110N base oil (250.27 g). The reaction was heated to 150° C. at a constant stir rate of 300 rpm and under active nitrogen flow for 9 hours to allow complete polymer dissolution. The mixture was then maintained at 120° C. with 120 rpm stirring overnight under constant nitrogen flow. The following day, the temperature was increased to 130° C. and tryptophan (1.8 g, 8.81 mmols) and surfonic L24-2 (9.0 g). After 3 hours the reaction's temperature was raised to 165° C., then NPPDA (1.62 g, 8.79 mmols) was added, and the reaction was held for an additional 3 hours. After this period, 2-phenyl-2-oxazoline (1.3 g, 8.83 mmols) was added and the reaction was held at 165° C. for an additional 3 hours. The reaction was allowed to cool to 130° C., filtered through a 100 mesh (140 μm) filter, and then cooled to room temperature.

Example 6

This Example shows the capping of histidine and NPPDA to an acylated olefin copolymer. To a 500 mL, 4 neck resin kettle equipped with a heating mantle, a pitched 3 blade overhead stirrer, a thermocouple, a nitrogen inlet, nitrogen outlet and condenser was added Maleated OCP-1 (36 g), and Phillips 66 110N base oil (252.37 g). The reaction was heated to 150° C. at a constant stir rate of 300 rpm and under active nitrogen flow for 9 hours to allow complete polymer dissolution. The mixture was then maintained at 120° C. with 120 rpm stirring overnight under constant nitrogen flow. The following day, the temperature was increased to 130° C. and histidine (1.01 g, 5.97 mmols) and surfonic L24-2 (9.0 g) were added. After 3 hours the reaction's temperature was raised to 165° C., then NPPDA (1.62 g, 8.79 mmols) was added, and the reaction was held for an additional 3 hours. The reaction was allowed to cool to 130° C., filtered through a 100 mesh (140 μm) filter, and then cooled to room temperature.

Example 7

This Example described the capping of glutamic acid and NPPDA to an acylated olefin copolymer, and the post-treating with oxazoline. To a 500 mL, 4 neck resin kettle equipped with a heating mantle, a pitched 3 blade overhead stirrer, a thermocouple, a nitrogen inlet, nitrogen outlet and condenser was added Maleated OCP-1 (36 g), and Phillips 66 110N base oil (250.38 g). The reaction was heated to 150° C. at a constant stir rate of 300 rpm and under active nitrogen flow for 9 hours to allow complete polymer dissolution. The mixture was then maintained at 120° C. with 120 rpm stirring overnight under constant nitrogen flow. The following day, the temperature was increased to 130° C. and Glutamic acid (1.29 g, 8.77 mmols) and surfonic L24-2 (9.0 g) were added. After 3 hours the reaction's temperature was raised to 165° C., then NPPDA (1.62 g, 8.79 mmols) was added, and the reaction was held for an additional 3 hours. After this period, 2-phenyl-2-oxazoline (1.3 g, 8.83 mmols) was added and the reaction was held at 165° C. for an additional 3 hours. The reaction was allowed to cool to 130° C., filtered through a 100 mesh (140 μm) filter, and then cooled to room temperature.

Example 8

This Example show the capping of aspartic Acid and NPPDA to an acylated olefin copolymer. To a 500 mL, 4 neck resin kettle equipped with a heating mantle, a pitched 3 blade overhead stirrer, a thermocouple, a nitrogen inlet, nitrogen outlet and condenser was added Maleated OCP-1 (36 g), and Phillips 66 110N base oil (250.85 g). The reaction was heated to 150° C. at a constant stir rate of 300 rpm and under active nitrogen flow for 9 hours to allow complete polymer dissolution. The mixture was then maintained at 120° C. with 120 rpm stirring overnight under constant nitrogen flow. The following day, the temperature was increased to 130° C. and Aspartic Acid (1.17 g, 7.95 mmols) and surfonic L24-2 (9.0 g). After 3 hours the reaction's temperature was raised to 165° C., then NPPDA (2.97 g, 16.12 mmols) was added, and the reaction was held for an additional 3 hours. The reaction was allowed to cool to 130° C., filtered through a 100 mesh (140 μm) filter, and then cooled to room temperature.

Example 9

This Example shows capping of 6-aminocaproic acid and NPPDA to an acylated olefin copolymer. To a 500 mL, 4 neck resin kettle equipped with a heating mantle, a pitched 3 blade overhead stirrer, a thermocouple, a nitrogen inlet, nitrogen outlet and condenser was added Maleated OCP-2 (36 g), and Phillips 66 110N base oil (250.85 g). The reaction was heated to 150° C. at a constant stir rate of 300 rpm and under active nitrogen flow for 9 hours to allow complete polymer dissolution. The mixture was then maintained at 120° C. with 120 rpm stirring overnight under constant nitrogen flow. The following day, the temperature was increased to 130° C. and 6-aminocaproic acid (1.17 g, 8.76 mmols) and surfonic L24-2 (9.0 g) were added. After 3 hours the reaction's temperature was raised to 165° C., then NPPDA (1.62 g, 8.79 mmols) was added, and the reaction was held for an additional 3 hours. The reaction was allowed to cool to 130° C., filtered through a 100 mesh (140 μm) filter, and then cooled to room temperature.

Comparative Example 1

HiTEC® 5748A (Comparative Polymer 1 is a commercially available olefin copolymer viscosity index improver which is recommended for use in industrial, gasoline and diesel crankcase lubricants, particularly when excellent shear stability is desired.

Comparative Example 2

High molecular weight multifunctional olefin copolymers (Comparative Polymer 2) were prepared by the same general method previously described in the literature.

An acylated ethylene-propylene copolymer having an average molecular weight of approximately 56,000 Mn was obtained by grafting maleic anhydride to an ethylene-propylene copolymer. The reaction stoichiometry and reaction conditions were such that allowed 11.4 molecules of maleic anhydride to be grafted onto the olefin copolymer backbone or about 0.41 carboxylic groups per 1,000 Mn of the polymer backbone (i.e. 2×11.4=22.8 carboxylic groups/56,000 Mn=0.41 carboxylic groups/1000 Mn). The acylated ethylene-propylene copolymer was reacted with a molar excess of N-phenyl-1.4-phenylene diamine (NPPDA) relative to the grafted acyl groups, in the presence of a surfactant (at about 160° C. for approximately six hours). For color stabilization, the reaction mixture containing the imine product was combined with an aldehyde for 4 hours. The final polymer was diluted with 110N oil to have a 12 wt % polymer content. The reaction was allowed to cool to about 130° C. and filtered through a 100 mesh (140 μm) filter. The product was allowed to cool to room temperature and tested for visometric and dispersant properties.

Thin film friction (TFF) was measured on a mini-traction machine (MTM). The TFF test measures thin-film lubrication regime traction coefficients using a Mini-Traction Machine (MTM) from PCS Instruments. These traction coefficients were measured at 130° C. with an applied load of 50N between an ANSI 52100 steel disk and an ANSI 52100 steel ball as oil was being pulled through the contact zone at an entrainment speed of 500 mm/s. A slide-to-roll ratio of 50% between the ball and disk was maintained during the measurements.

For each viscosity modifier, a steel ball is loaded against the face of a disc where the ball and disc are independently driven to create mixed rolling and sliding contact. The frictional forces (i.e. the coefficient of friction) between the ball and the disc are measured by a force transducer. The lower the coefficient of friction the better the performance which also translates to fuel economy.

TABLE 3

MTM Test Results

| Polymer | MTM |
|---|---|
| Base Fluid | 0.066 |
| Example 1 | 0.044 |
| Example 2 | 0.049 |
| Example 4 | 0.044 |
| Example 6 | 0.070 |
| Example 8 | 0.043 |
| Comparative Example 1 | 0.064 |
| Comparative Example 2 | 0.055 |

Each of the viscosity modifiers in Examples 1 to 9 were further tested for their ability to disperse sooted oil. By varying the concentration of polymer in sooted oil, the effective concentration (E.C.), which is the minimum weight percent concentration for the polymer to completely disperse soot, was determined according to the method described in U.S. Pat. No. 8,927,469, which is incorporated herein by reference.

In order to evaluate lubricant formulations according to this disclosure, the invented polymers were tested for their ability to disperse soot. Without dispersant, an oil containing soot particles has a shear thinning (non-Newtonian) behavior where viscosity decreases with increasing shear rate due to the agglomeration of soot particles at low shear rate resulting in high viscosity, while at higher shear rate, soot particle agglomeration was broken up resulting in low viscosity. If an additive with dispersant capability is added to a sooted oil, the soot particles are protected by the dispersant without agglomeration, thus the oil has an ideally viscous or Newtonian fluid behavior where viscosity is independent of shear rate. (See, e.g., Thomas G. Mezger, The Rheology Handbook, 3rd Revised Edition, 2011, portions thereof are incorporated herein by reference.) Based on this, a dispersancy test consistent to that described in U.S. Pat. No. 8,927,469 (which is incorporated herein by reference) was designed to test effectiveness of the inventive polymers to disperse soot particles using a Physica MCR 301 Rheometer (Anton Parr). For this test, a sooted oil have about 4.6 weight percent soot was generated from a fired diesel engine using a fluid that contains no dispersants. The sooted oil was then top treated with a certain amount of polymers and then tested by a shear rate sweep in a rheometer with a 40 cm plate with Peltier temperature control to look for Newtonian/non-Newtonian behavior. Test temperature is about 100° C. and the test top plate is CP50-1 (Anton Parr).

In this test, the viscosity of sooted oil with or without the viscosity modifier was used to achieve the effective concentration levels. Specifically, for each sample, the effective concentration (E.C.) was the minimal polymer concentration that was required to achieve a viscosity of the sooted oil that did not change as shear rate was increased as noted above. The lower the effective concentration, the lower the polymer treat rate and the better dispersant performance of the functionalized polymer being tested (see Table 4 below).

TABLE 4

Dispersency Testing

| Polymer | Effective Concentration, % |
|---|---|
| Example 1 | N.D.* |
| Example 2 | 1.01 |
| Example 3 | 1.04 |
| Example 4 | 0.81 |
| Example 5 | 0.99 |
| Example 6 | 0.82 |
| Example 7 | 0.79 |
| Example 8 | 0.76 |
| Example 9 | N.D.* |
| Comparative Example 2 | 0.65 |

*N.D. is no dispersency

In most inventive examples an effective concentration (EC) of around 1 weight percent could be achieved. Inventive examples 4, 6, 7, and 8 had the best overall effective concentration comparable in performance with Comparative Example 2.

Seal performance testing is a screening procedure used to assess the impact of various lubricant components on the lifetime of engine fluoro-elastomer seals. Fluoro-elastomer performance testing is based on ASTM D471 12a, ASTM 412 06a, ASTM D2240 05, and ASTM D5662 14, which are incorporated herein by reference. Depending on the chemical nature and size of the additive or polymeric components, these may diffuse in and/or interact with the elastomers, thereby decreasing their lifetime. Lowering the treat rate to improve seal performance may cause some benefits associated with higher treat rates to be lost.

Table 5 below summarizes functional polymer performance at various treat rates (2 to 10 wt %) with a heavy duty diesel DI pact treat (8.0 wt %) in 6 Star Motiva base oil. Two main features of the mechanical test are the average elongation at rupture (avg. ER) and the average tensile strength (avg. TS). Values must be greater than −55% for avg. ER and greater than −50% for average TS. At all tested treat rates, Comparative Polymer 2 (Comparative Example 2) failed both average elongation and tensile strength. Polymers from Examples 1 and 6 passed both tests at all concentrations, polymers from Example 2 passed both tests at the 2 and 5 weight percent treat rates, and the remaining polymers tended to minimize the impact on the seals.

TABLE 5

Average Elongation Rupture (ER) and Tensile Strength (TS) for the example polymers.

| Functional Polymer | Treat Rate (wt %) | Seal Performance Avg ER % (pass > −55%) | Avg TS % (pass > −50%) |
|---|---|---|---|
| Example 1 | 2.0 | −42.26 | −42.58 |
| Example 1 | 5.0 | −46.37 | −44.53 |
| Example 1 | 10.0 | −48.14 | −48.14 |
| Example 2 | 2.0 | −46.13 | −44.25 |
| Example 2 | 5.0 | −49.38 | −48.69 |
| Example 2 | 10.0 | −55.57 | −49.17 |
| Example 4 | 2.0 | −55.15 | −48.26 |
| Example 4 | 5.0 | −59.91 | −53.63 |
| Example 4 | 10.0 | −45.93 | −39.18 |
| Example 6 | 2.0 | −49.00 | −44.98 |
| Example 6 | 5.0 | −53.46 | −50.54 |
| Example 6 | 10.0 | −48.54 | −46.96 |
| Example 8 | 2.0 | −53.30 | −49.05 |
| Example 8 | 5.0 | −59.75 | −57.31 |
| Example 8 | 10.0 | −37.79 | −42.18 |
| Comparative Example 2 | 2.0 | −57.5 | −53.5 |
| Comparative Example 2 | 5.0 | −59.9 | −58.9 |
| Comparative Example 2 | 10.0 | −62.2 | −59.7 |

TABLE 6

DI Additive Package

| Component Name | Wt. % |
|---|---|
| Dispersant | 4.5 |
| Diluent Oil | 0.47 |
| Defoamer | 0.006 |

TABLE 6-continued

DI Additive Package

| Component Name | Wt. % |
|---|---|
| Detergent | 1.55 |
| Antioxidant | 1.2 |
| Anti-wear Agent | 1.12 |
| Friction Modifier | 0.45 |
| Pour Point Depressant | 0.2 |
| Total Treat | 9.50 |

Example 13

The polymers herein were further evaluated for various low and high temperature performance. The polymer treat rate in each sample was varied depending on the amount of the polymer needed to reach a target $KV_{100}$. In general, the amount of polymer ranged from 0.49 to 1.01 wt. % based on the total weight of the finished oil composition.

Each of the formulations were tested for cold weather performance (CCS), kinematic viscosity at 100° C. and 40° C., low-temperature pumping viscosity (MRV-35), high temperature high shear viscosity (TBS), and low temperature high shear viscosity (ASTM-D6616 (TBS)). ASTM-D6616 is a high shear viscosity test performed at 100° C. while the TBS is a high shear viscosity test conducted at 150° C. The Cold Crank Simulator (CCS) test is a measure of cold weather performance and this test was carried out according to the method of ASTM D5293 at −30° C. Results are shown in Table 7 below.

TABLE 7

| | 1 | 2 | 3 | 4 | 5 | 6 | 7 | 8 | 9 | CE 1 | CE2 |
|---|---|---|---|---|---|---|---|---|---|---|---|
| KV100° C. (St) | 10.57 | 11.05 | 11.04 | 11.02 | 10.54 | 10.96 | 11.06 | 11.09 | 11.07 | 11.07 | 10.95 |
| KV40° C. (St) | 64.52 | 70.91 | 69.56 | 73.6 | 67.06 | 73.27 | 77.41 | 75.86 | 72.45 | 68.51 | 76.02 |
| CCS-30 (P) | 7269 | 6645 | 6561 | 6718 | 6535 | 6606 | 6913 | 6790 | 7442 | 7558 | 7327 |
| MRV-35 (P) | 30600 | 35000 | 34700 | 37800 | 33100 | 36500 | 40900 | 39800 | 37800 | 29200 | 46100 |
| TBS150° C. (P) | 2.82 | 2.9 | 2.85 | 2.96 | 2.76 | 3.01 | 2.99 | 3.04 | 2.99 | 3.31 | 3.17 |
| D6616-TBS 100° C. (P) | 6.38 | 6.38 | 6.28 | 6.41 | 6.13 | 6.6 | 6.62 | 6.68 | 6.81 | 7.68 | 7.24 |
| Viscosity Index | 153 | 147 | 150 | 140 | 145 | −139 | 132 | 136 | 143 | 154 | 133 |

In general, the cold cranking temperature performance was improved when compared to the polymer used in comparative examples 1 and 2. Improvement in the cold cranking temperature performance ranged from 1.5% to 13.5%. In particular, examples 3 and 5, showed best overall performance—low CCS and good TBS which meets SAE J300 criteria. It shows that using the inventive polymers can effectively make a failed 5W30 formulation to a passing 5W30 formulation by just changing the viscosity modifier.

It is to be understood that while the additives and lubricant of this disclosure have been described in conjunction with the detailed description thereof and summary herein, the foregoing description is intended to illustrate and not limit the scope of the disclosure, which is defined by the scope of the appended claims. Other aspects, advantages, and modifications are within the scope of the claims. It is intended that the specification and examples be considered as exemplary only, with a true scope of the disclosure being indicated by the following claims.

What is claimed is:

1. A multi-functional olefin copolymer lubricant additive comprising a reaction product of an acylated olefin copolymer and an amino mono- or di-carboxylic acid, and wherein the amino mono- or di-carboxylic acid has the formula

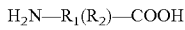

wherein
$R_1$ is a C1 to C18 hydrocarbyl group;
$R_2$ is hydrogen, a linear or branched alkyl group, an aryl group, a hydroxyphenyl group, a heterocyclic amino group, a carboxyl group, an amido group, an amino group, a hydroxyl group, a thiol, a thioester, selenium, or combinations thereof; and
wherein the acylated olefin copolymer is derived from a copolymer of ethylene and one or more C3 to C18 alpha-olefins and a grafted ethylenically unsaturated carboxylic acid material selected from acrylic acid, methacrylate acid, cinnamic acid, crotonic acid, maleic acid, fumaric acid or anhydride derivatives thereof.

2. The multi-functional olefin copolymer lubricant additive of claim 1, wherein the reaction product is further reacted with an amine, ester, or alcohol functionalization agent, and the amine, ester, or alcohol functionalization agent is selected from aromatic amines, polyaromatic amines, primary amines, secondary amines, primary or secondary alcohols, napthyl alkyl amines, and mixtures thereof.

3. The multi-functional olefin copolymer lubricant additive of claim 1, wherein the reaction product is formed in either the L or D isomeric form.

4. The multi-functional olefin copolymer lubricant additive of claim 1, wherein the reaction product is either neutral or ionic.

5. The multi-functional olefin copolymer lubricant additive of claim 1, wherein the acylated olefin copolymer includes an olefin copolymer having grafted thereon from 0.1 to 0.8 carboxylic groups per 1000 number average molecular weight units of the olefin copolymer.

6. The multi-functional olefin copolymer lubricant additive of claim 5, wherein the olefin copolymer has a number average molecular weight between about 5,000 and about 200,000 as measured by GPC using polystyrene as reference.

7. The multi-functional olefin copolymer lubricant additive of claim 1, wherein $R_1$ is a methylene group and $R_2$ is the heterocyclic amino group selected from an indole alkyl group or an imidazole alkyl group.

8. The multi-functional olefin copolymer lubricant additive of claim 1, wherein the amino mono- or di-carboxylic acid is selected from amino hexanoic acid, 2-amino-3-phenyl propanoic acid, 2-amino-3-(1H-indol-3-yl) propanoic acid, 2-amino-3-(1H-imidazol-5-yl) propanoic acid, 2-amino butane dioic acid, 2-amino pentane dioic acid, 2-amino-4-methylpentanoic acid, and mixtures thereof.

9. The multi-functional olefin copolymer lubricant additive of claim 1, wherein the reaction product is further reacted with an amine, ester, or alcohol functionalization agent, and wherein a primary or secondary amine thereof is capped with an oxazoline or derivative thereof.

10. The multi-functional olefin copolymer lubricant additive of claim 9, wherein the oxazoline or derivative thereof is 2-phenyl-2-oxazoline; 2-ethyl-2 oxazoline; 2-methyl-2-oxazoline; 2-benzyl-4,4-dimethyl-2-oxazoline; 2-ethyl-4,4-dimethyl-2 oxazoline; 2,4,4-trimethyl-2-oxazoline; 4,4-dimethyl-2-oxazoline; 2,4,5-trimethyl-3-oxazoline; dimethoxyphenyl)-4,4-dimethyl-2-oxazoline; 2-[1-(hydroxymethyl)ethyl] oxazoline; mixtures thereof, or derivatives thereof.

11. The multi-functional olefin copolymer lubricant additive of claim 1, wherein the reaction product is further reacted with an amine, ester, or alcohol functionalization agent, and wherein the amine functionalization agent is selected from N-arylphenylene-diamine, 1-(2-amino-ethyl)-imidazolidin-2-one, N-(3-aminopropyl) morpholine, 3-(dimethylamino)-1-propylamine, N-phenyl-p-phenylenediamine, N-(3-aminopropyl)-2 pyrrolidinone, aminoethylacetamide, alanine methyl ester, 1-(3-aminopropyl) imidazole, polyetheramine, phenoxypropylamine, aromatic derivatives thereof, and combinations thereof.

12. The multi-functional olefin copolymer lubricant additive of claim 11, wherein the amine functionalization agent is an N arylphenylenediamine of the formula

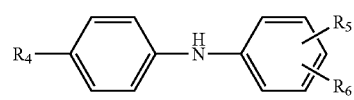

wherein $R_4$ is hydrogen, —NH-aryl, —NH-arylalkyl, —NH-alkyl, or a branched or straight chain radical having from 4 to 24 carbon atoms that can be alkyl, alkenyl, alkoxyl aralkyl, alkaryl, hydroxyalkyl or aminoalkyl; $R_5$ is —NH$_2$, CH$_2$—(CH$_2$), —NH$_2$, or CH$_2$-aryl-NH$_2$, in which n is an integer from 1 to 10; and $R_6$ is hydrogen, alkyl, alkenyl, alkoxyl, aralkyl, or alkaryl having from 4 to 24 carbon atoms.

13. The multi-functional olefin copolymer lubricant additive of claim 12, wherein the N arylphenylenediamine is selected from N-phenyl-1,4-phenylenediamine; N-phenyl-1,3-phenyl endi amine; N-phenyl-1,2-phenylenediamine; and mixtures thereof.

14. A lubricant composition comprising:
a major amount of base oil of lubricating viscosity; and
a multi-functional olefin copolymer viscosity modifier comprising a reaction product of an acylated olefin copolymer and an amino mono- or di-carboxylic acid, and wherein the amino mono- or di-carboxylic acid has the formula

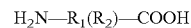

wherein
$R_1$ is a C1 to C18 hydrocarbyl group;
$R_2$ is hydrogen, a linear or branched alkyl group, an aryl group, a hydroxyphenyl group, a heterocyclic amino group, a carboxyl group, an amido group, an amino group, a hydroxyl group, a thiol, a thioester, selenium, or combinations thereof; and
wherein the acylated olefin copolymer is derived from a copolymer of ethylene and one or more C3 to C18 alpha-olefins and a grafted ethylenically unsaturated carboxylic acid material selected from acrylic acid, methacrylate acid, cinnamic acid, crotonic acid, maleic acid, fumaric acid or anhydride derivatives thereof.

15. The lubricant composition of claim 14, wherein the reaction product is further reacted with an amine, ester, or alcohol functionalization agent, and the amine, ester, or alcohol functionalization agent is selected from aromatic amines, polyaromatic amines, primary amines, secondary amines, primary or secondary alcohols, napthyl alkyl amines, and mixtures thereof.

16. The lubricant composition of claim 14, wherein the reaction product is formed in either the L or D isomeric form.

17. The lubricant composition of claim 14, wherein the reaction product is either neutral or ionic.

18. The lubricant composition of claim 14, wherein the acylated olefin copolymer includes an olefin copolymer having grafted thereon from 0.1 to 0.8 carboxylic groups per 1000 number average molecular weight units of the olefin copolymer.

19. The lubricant composition of claim 18, wherein the olefin copolymer has a number average molecular weight between about 5,000 and about 200,000 as measured by GPC using polystyrene as reference.

20. The lubricant composition of claim 14, wherein $R_1$ is a methylene group and $R_2$ is the heterocyclic amino group selected from an indole alkyl group or an imidazole alkyl group.

21. The lubricant composition of claim 14, wherein the amino mono- or di-carboxylic acid is selected from amino hexanoic acid, 2-amino-3-phenyl propanoic acid, 2-amino-3-(1H-indol-3-yl) propanoic acid, 2-amino-3-(1H-imidazol-5-yl) propanoic acid, 2-amino butane dioic acid, 2-amino pentane dioic acid, 2-amino-4-methylpentanoic acid, and mixtures thereof.

22. The lubricant composition of claim 14, wherein the reaction product is further reacted with an amine, ester, or alcohol functionalization agent, and wherein a primary or secondary amine thereof is capped with an oxazoline or derivative thereof.

23. The lubricant composition of claim 22, wherein the oxazoline or derivative thereof is 2-phenyl-2-oxazoline; 2-ethyl-2 oxazoline; 2-methyl-2-oxazoline; 2-benzyl-4,4-dimethyl-2-oxazoline; 2-ethyl-4,4-dimethyl-2 oxazoline; 2,4,4-trimethyl-2-oxazoline; 4,4-dimethyl-2-oxazoline; 2,4,5-trimethyl-3-oxazoline; 2-(2,6-dimethoxyphenyl)-4,4-dimethyl-2-oxazoline; 2-[1-(hydroxymethyl)ethyl] oxazoline; mixtures thereof, or derivatives thereof.

24. The lubricant composition of claim 14, wherein the reaction product is further reacted with an amine, ester, or alcohol functionalization agent, and wherein the amine functionalization agent is selected from N-arylphenylenediamine, 1-(2-amino-ethyl)-imidazolidin-2-one, N-(3-aminopropyl) morpholine, 3-(dimethylamino)-1-propylamine, N-phenyl-p-phenylenediamine, N-(3-aminopropyl)-2 pyrrolidinone, aminoethylacetamide, alanine methyl ester, 1-(3-aminopropyl) imidazole, polyetheramine, phenoxypropylamine, aromatic derivatives thereof, and combinations thereof.

25. The lubricant composition of claim 24, wherein the amine functionalization agent is an N arylphenylenediamine of the formula

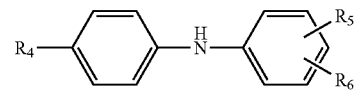

wherein $R_4$ is hydrogen, —NH-aryl, —NH-arylalkyl, —NH-alkyl, or a branched or straight chain radical having from 4 to 24 carbon atoms that can be alkyl, alkenyl, alkoxyl aralkyl, alkaryl, hydroxyalkyl or aminoalkyl; $R_5$ is —NH$_2$, CH$_2$—(CH$_2$), —NH$_2$, or CH$_2$-aryl-NH$_2$, in which n is an integer from 1 to 10; and $R_6$ is hydrogen, alkyl, alkenyl, alkoxyl, aralkyl, or alkaryl having from 4 to 24 carbon atoms.

26. The lubricant composition of claim 25, wherein the N-arylphenylenediamine is selected from N-phenyl-1,4-phenylenediamine; N-phenyl-1,3-phenylendiamine; N-phenyl-1,2-phenylenediamine; and mixtures thereof.

27. The multi-functional olefin copolymer lubricant additive of claim 1, wherein the reaction product is an olefin copolymer with grafted carboxylic acid substituted succinimide moieties thereon.

28. The lubricant composition of claim 14, wherein the reaction product is an olefin copolymer with grafted carboxylic acid substituted succinimide moieties thereon.

* * * * *